(12) United States Patent
Flake et al.

(10) Patent No.: US 7,698,166 B2
(45) Date of Patent: Apr. 13, 2010

(54) IMPORT/EXPORT TAX TO DEAL WITH AD TRADE DEFICITS

(75) Inventors: Gary W. Flake, Bellevue, WA (US); Brett D. Brewer, Sammamish, WA (US); Christopher A. Meek, Kirkland, WA (US); David Max Chickering, Bellevue, WA (US); Jody D. Biggs, Redmond, WA (US); Ewa Dominowska, Kirkland, WA (US); Brian Burdick, Bellevue, WA (US); Hrishikesh Bal, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 204 days.

(21) Appl. No.: 11/747,963

(22) Filed: May 14, 2007

(65) Prior Publication Data

US 2008/0103947 A1 May 1, 2008

Related U.S. Application Data

(60) Provisional application No. 60/862,969, filed on Oct. 25, 2006.

(51) Int. Cl.
*G06Q 20/00* (2006.01)
(52) U.S. Cl. .......................................... 705/19; 705/14
(58) Field of Classification Search ................. 704/226; 705/14, 19, 26, 35, 37, 400; 707/1, 100; 726/4, 27
See application file for complete search history.

(56) References Cited

U.S. PATENT DOCUMENTS 5,794,210 A 8/1998 Goldhaber et al.
5,855,008 A 12/1998 Goldhaber et al.
5,999,975 A 12/1999 Kittaka et al.
6,036,601 A 3/2000 Heckel (Continued)

FOREIGN PATENT DOCUMENTS

EP 1209600 A1 5/2002

(Continued)

OTHER PUBLICATIONS

Paul d. Berger, Rajiv P. Dant, Modelling Cooperative Advertising Decisions in Franchising, Sep. 1996, Palgrave Macmillan Journals on behalf of the Operation Research Society, vol. 47, No. 9, pp. 1120-1136 (Attached).*

(Continued)

*Primary Examiner*—Matthew S Gart
*Assistant Examiner*—Rokib U. Masud
(74) *Attorney, Agent, or Firm*—Shook, Hardy & Bacon L.L.P.

(57) ABSTRACT

For a multi-party advertising exchange including advertising and publishing entities, each participant specifies tax rate(s), such as import tax and export tax, that apply to at least one other entity in the exchange. Since tax rate(s) can be expressed in different transactional terms by different parties, each tax rate is reduced to a common tax rate expression within the exchange for comparison. Intelligent tax rate selection and support can be provided to dynamically set tax rates that achieve utilitarian goals for the individual participants taking into account the tax rates expressed by other participants and their respective advertising goals, and dynamically adjusting tax rates over time in response to condition changes. Various refinements are provided and disclosed according to a host of optional implementations.

19 Claims, 19 Drawing Sheets

U.S. PATENT DOCUMENTS

| | | |
|---|---|---|
| 6,286,005 B1 | 9/2001 | Cannon |
| 6,808,173 B2 | 10/2004 | Snow |
| 7,222,099 B2 | 5/2007 | Forsythe et al. |
| 7,496,943 B1 | 2/2009 | Goldberg et al. |
| 2002/0013167 A1 | 1/2002 | Spaur et al. |
| 2002/0046157 A1 | 4/2002 | Solomon |
| 2002/0049667 A1 | 4/2002 | Navani |
| 2002/0062248 A1 | 5/2002 | Sakirai |
| 2002/0082983 A1 | 6/2002 | Oshiba et al. |
| 2002/0091574 A1* | 7/2002 | Lefebvre et al. ............. 705/19 |
| 2002/0107779 A1 | 8/2002 | Maltzman |
| 2003/0036975 A1 | 2/2003 | Martin et al. |
| 2003/0069831 A1* | 4/2003 | Le et al. ...................... 705/37 |
| 2003/0135460 A1 | 7/2003 | Talegon |
| 2004/0103024 A1* | 5/2004 | Patel et al. ................... 705/14 |
| 2004/0128224 A1 | 7/2004 | Dabney et al. |
| 2004/0148222 A1 | 7/2004 | Sabella et al. |
| 2004/0254853 A1 | 12/2004 | Heene et al. |
| 2005/0043998 A1* | 2/2005 | Bross et al. ................... 705/19 |
| 2005/0065844 A1 | 3/2005 | Raj et al. |
| 2005/0097204 A1 | 5/2005 | Horowitz et al. |
| 2005/0119934 A1 | 6/2005 | Kamiyama |
| 2005/0144068 A1 | 6/2005 | Calabria et al. |
| 2005/0148377 A1 | 7/2005 | Goldberg et al. |
| 2005/0177431 A1 | 8/2005 | Willis et al. |
| 2005/0246231 A1 | 11/2005 | Shkedi |
| 2006/0004633 A1 | 1/2006 | Ashbaugh |
| 2006/0026061 A1 | 2/2006 | Collins |
| 2006/0155597 A1 | 7/2006 | Gleason |
| 2006/0155638 A1 | 7/2006 | de la Motte |
| 2006/0173744 A1 | 8/2006 | Kandasamy et al. |
| 2006/0212350 A1 | 9/2006 | Ellis et al. |
| 2006/0248035 A1 | 11/2006 | Gendler et al. |
| 2006/0271389 A1 | 11/2006 | Goodman et al. |
| 2006/0271425 A1 | 11/2006 | Goodman et al. |
| 2006/0271429 A1 | 11/2006 | Borgs et al. |
| 2006/0271438 A1 | 11/2006 | Shotland et al. |
| 2007/0027753 A1 | 2/2007 | Collins |
| 2007/0027771 A1 | 2/2007 | Collins et al. |
| 2007/0027772 A1 | 2/2007 | Chou |
| 2007/0033107 A1 | 2/2007 | Ubale et al. |
| 2007/0050254 A1 | 3/2007 | Driscoll |
| 2007/0061204 A1 | 3/2007 | Ellis et al. |
| 2007/0067297 A1 | 3/2007 | Kiblickis |
| 2007/0100708 A1 | 5/2007 | Smith et al. |
| 2007/0130005 A1 | 6/2007 | Jaschke |
| 2007/0198350 A1 | 8/2007 | O'Kelley et al. |
| 2007/0199017 A1 | 8/2007 | Cozen et al. |
| 2007/0260520 A1 | 11/2007 | Jha et al. |
| 2007/0271145 A1 | 11/2007 | Vest |
| 2007/0276800 A1 | 11/2007 | Lee |
| 2008/0097829 A1 | 4/2008 | Ritter |
| 2008/0154784 A1 | 6/2008 | Veeraraghavan |

FOREIGN PATENT DOCUMENTS

| | | |
|---|---|---|
| KR | 1020020012326 A | 2/2002 |
| KR | 1020020067941 A | 8/2002 |
| WO | 0024484 A1 | 5/2000 |
| WO | WO0042593 A1 | 7/2000 |
| WO | WO0140893 A2 | 6/2001 |
| WO | 2004114083 A2 | 12/2004 |
| WO | 2006110873 A2 | 10/2006 |
| WO | 2007/047310 A2 | 4/2007 |

OTHER PUBLICATIONS

Bjorn Knutsson. Peer-to-Peer Support for Massively Multiplayer Games. Jul. 4, 2004. http://www.cs.ualberta.ca/~anup/Courses/604/Presentation_files/Lihang/P2Pgames_Infocom04_Upenns.pdf.

Monty Giaveli. Connect 2.01. Sep. 5, 2005. http://www.allworldsoft.com/software/4-906-connect.htm.

Haring. "The Virtual Location of E-Tailers: Evidence from a B2C E-Commerce Market" (2005) ZEW (Centre for European Economic Research) Discussion Paper No. 05-52, 26 pages.

Madani, et al. "Contextual Recommender Problems" (2005) ACM, pp. 86-89.

Lan Zhao, et al., "A network modeling approach for the optimization of Internet-based advertising strategies and pricing with a quantitative explanation of two paradoxes", Aug. 31, 2007, 2 pages. http://portal.acm.org/citation.cfm?id=1188190.

International Search Report dated Feb. 12, 2008 for PCT Application Serial No. PCT/US2007/081840, 3 Pages.

Bae, et al. "The Profitability of Index Futures Arbitrage: Evidence from Bid-Ask Quotes," http://home.ust.hk/~kachan/research/arbitrage.pdf, May 1998, 32 pages.

"Index-Futures Arbitrage and the Behavior of Stock Index Futures Prices," http://press.princeton.edu/books/lo/chapt11.pdf, last accessed Apr. 4, 2007.

"Arbitage Opportunities, Brokerage, Finance businesses, miscellaneous," http://www.experienced-people.co.uk/1042-top-ways-of-making-money-online/5-last-but-not-least.htm, last accessed Apr. 4, 2007.

OA dated Dec. 31, 2008 for U.S. Appl. No. 11/675,343, 34 pages.
OA Dated Dec. 31, 2008 for U.S. Appl. No. 11/735,753, 35 pages.
OA Dated Dec. 24, 2008 for U.S. Appl. No. 11/753,790, 30 pages.
OA_dated_Feb. 5, 2009 for_U.S. Appl. No. 11/747,963_-_34_pages.

* cited by examiner

Participant to Participant

Exchange to Exchange

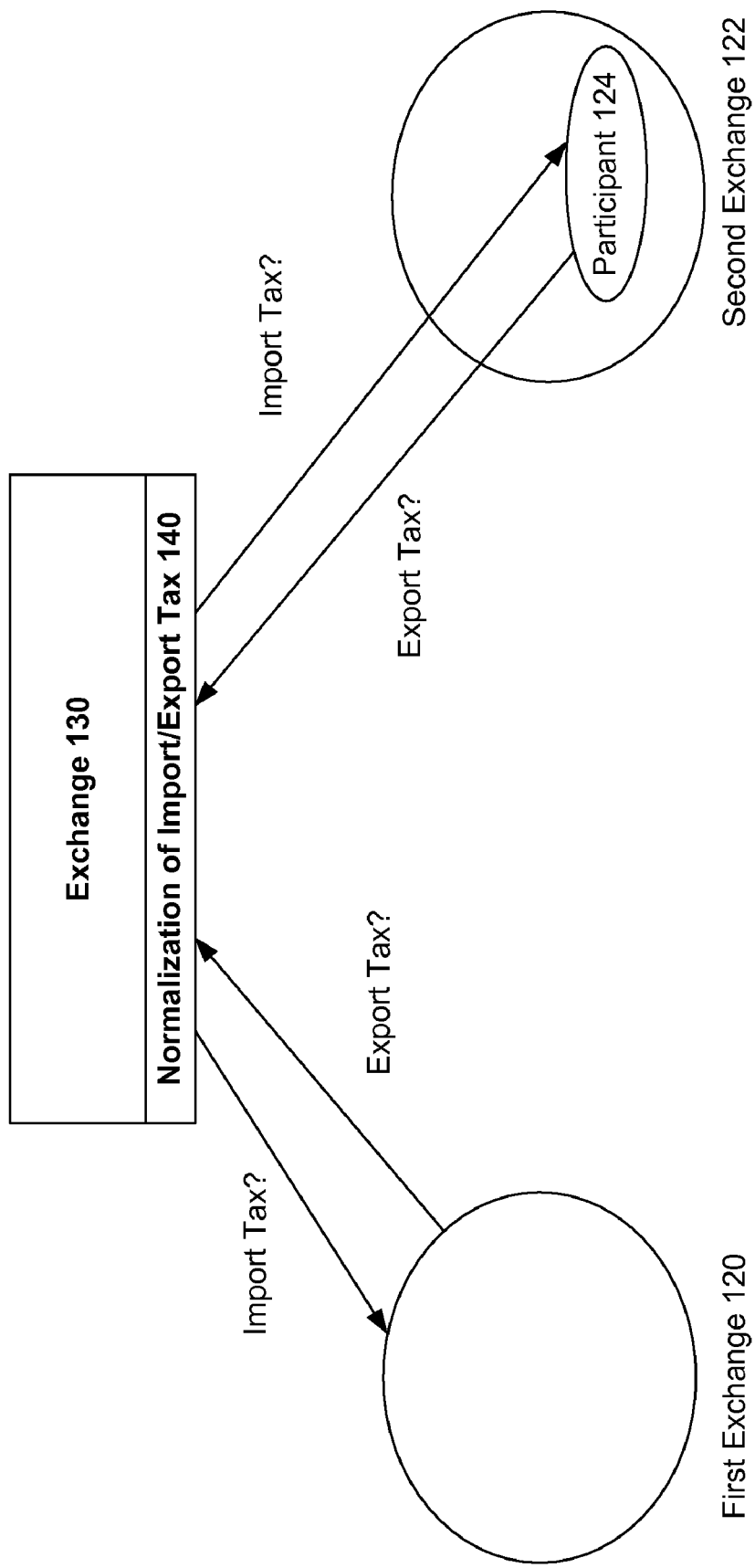

US 7,698,166 B2

IMPORT/EXPORT TAX TO DEAL WITH AD TRADE DEFICITS

CROSS REFERENCE TO RELATED APPLICATIONS

This application claims priority to U.S. Patent Application Ser. No. 60/862,969, filed on Oct. 25, 2006, entitled "DISTRIBUTED ARCHITECTURES FOR ONLINE ADVERTISING", the entirety of which is incorporated herein by reference.

TECHNICAL FIELD

For online advertising architectures and environments, the subject disclosure relates to facilitating tax rate selection for different participants and to supporting participants to determine effective tax rates.

BACKGROUND

Conventionally, large web search engines have sold advertising space based on keyword-driven search results. For example, Yahoo! conducts auctions for certain keywords, and the highest bidders have their ads placed on pages containing Yahoo! search results, or they obtain preferred placement among the search results, i.e., at the top of the results list.

As web advertising has developed, a number of companies are acquiring large publisher bases from which they can sell advertisements. For instance, Google is signing up publishers into their AdSense ad network to broker publishing space from the publishers to a set of participating advertisers bidding for and purchasing the advertising space. Advertisers pay Google to serve advertisements to participants of the AdSense network. Google then pays some or all of the advertising revenue to the individual publishers. For example, a publisher in the AdSense network may have an article on its website that talks about digital cameras, and Google's AdSense displays digital camera advertisements from advertisers in the AdSense network on that website. Google auctions off the "digital camera" keyword to advertisers in its AdSense network and displays ads from the highest bidders.

However, there are a number of problems with this proprietary ad network model. First, companies that are building ad networks have an inherent conflict of interest because, as a broker for advertising deals, they represent both the publisher and the advertiser. Second, because there are multiple companies that are creating ad networks, advertisers have the burden of managing buys across many ad networks, which results in significant cost and complexity to the advertiser. Third, because publishers are for all practical purposes locked into a single ad network due to legal restrictions when signing up, the advertiser competition is limited, which results in lower return for the publishers. Fourth, the lack of general standards around terms and conditions, and behavioral segmentation is a major obstacle to reaching the full market value of online display advertising. There is also no current standardization across publishers for accepted media types and ad formats. Fifth, smaller publishers currently have very little power individually, even if they serve a hard-to-reach audience. Additionally, ISPs and other owners of large user databases are not realizing the full value of the information they have due to privacy concerns and lack of a proper marketplace.

For instance, elaborating on the lack of standards around terms and conditions of existing advertising transactions, there are a variety of disparate items in an advertising exchange that should be able to be automatically taken into account between different parties for transactions in an advertising exchange, but today, cannot be taken into account. An example of this lack of standards is with respect to tax rates, such as import and export tax rates, for participants in an exchange.

In this regard, currently, there is no clear way for exchange participants to understand the tax cycle that is applied to transactions between parties. Today, for instance, tax rates are applied by parties "willy nilly" without any true understanding of the propagation of costs that result from a change in tax rate. In this sense, tax rates cannot be understood in an apples-to-apples fashion between disparate parties because there is no way to normalize tax rates across all parties of an advertising exchange so that parties can understand the impact of tax rate changes on other parties in a more efficacious manner. Accordingly, what is desired is a way to normalize, view and modify the various tax rates (import, export, market, etc.) associated with an online advertising transaction between participants of an online exchange.

Moreover, oftentimes, when there are multiple advertisers bidding for the same publisher space, or when multiple publishers are competing for the same advertisers, each participant to the transaction may have different utility functions, which today manifest themselves in a variety of ways, and according to a variety of biases. Yet, there is no way for participants to automatically map their different utility functions to a sensible import or export tax rate selection, let alone, as part of an automatic mapping that dynamically changes in response to all other participants' tax rates. In other words, what is desired is a way to specify goals for advertising transactions that are automatically taken into account when populating tax rates for party transactions, and which is dynamically updated when other participants' tax rates are changed as a result of changing market conditions or changing utility functions of the other participants.

When one takes into consideration the myriad of other types of biases an advertiser or publisher may exhibit (e.g., preference for relevance, preference for quality, preference for time of day, preference for ecologically sound companies, etc.) in an exchange as part of an expression of their utility function, and that these preferences change over time, today, there is simply no way for participants to rationally set appropriate tax rates that address those preferences, let alone automatically. Thus, what is desired is a way to specify tax rates, such as import and export tax rates, for each participant of an advertising exchange, and to automatically adjust those tax rates based on ever evolving specific utility function(s) specified by participants of the advertising exchange.

The above-described deficiencies of current advertising environments are merely intended to provide an overview of some of the problems of today's advertising environments, and are not intended to be exhaustive. Other problems with the state of the art may become further apparent upon review of the description of various non-limiting embodiments of the invention that follows.

SUMMARY

For a multi-party advertising exchange including advertising and publishing entities, in accordance with objectives of the entities participating in the exchange, the invention enables each participant to specify one or more tax rates, such as import tax and export tax, that apply to at least one other entity in the exchange. In one non-limiting embodiment, to address the situation where tax rates are expressed in different transactional terms by different parties, each tax rate is reduced to a common tax rate expression within the exchange for comparison. Intelligent tax rate selection and support can be provided to dynamically set tax rates that achieve utilitarian goals for the individual participants taking into account the tax rates expressed by other participants and their respective advertising goals, and dynamically adjusting tax rates over time in response to condition changes.

For transactions in an advertising exchange, the invention thus enables dynamic auto-population of tax rates for participants that apply to different participants based on current market conditions and the dynamic goals of respective participants in the exchange. The various embodiments of tax rate normalization, selection, and intelligent selection support in accordance with the invention may be provided at the level of participant to participant within an exchange, at the level of exchange to exchange, at the level of participant to exchange, or vice versa. Various refinements are provided according to a host of optional embodiments.

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments of the invention in a simplified form as a prelude to the more detailed description of the various embodiments of the invention that follows.

BRIEF DESCRIPTION OF THE DRAWINGS

Various embodiments of the tax rate selection and support for online advertising in accordance with the present invention are further described with reference to the accompanying drawings in which:

FIGS. 1A, 1B and 1C are exemplary block diagrams illustrating that the various embodiments of the invention may be implemented according to participant to participant, participant to exchange (or vice versa) or exchange to exchange bases in accordance with the invention;

DETAILED DESCRIPTION

Overview

Figure 1A:
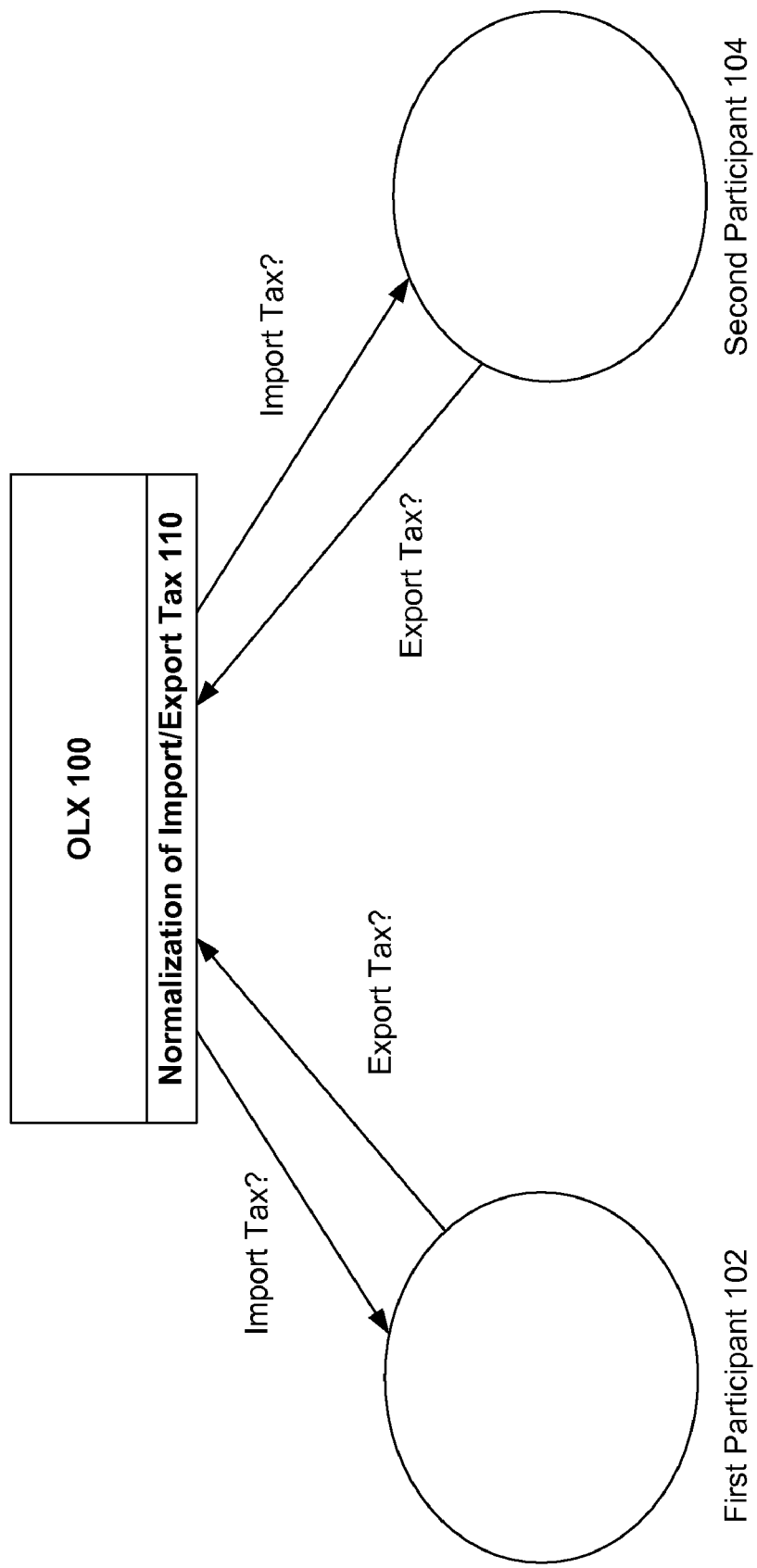

In various non-limiting embodiments, the invention is described in the context of a distributed architecture for online advertising, i.e., a market mechanism that manages the exchange of advertising goods among multiple participants on the advertising and/or publishing side, and across disparate advertising networks that today are exclusive of one another as described in the background. In part consideration of the limitations on existing architectures described in the background, the invention enables each participant to specify one or more tax rates, such as import tax and export tax, that apply to at least one other entity in the exchange.

If expressed according to different transactional terms by different parties, each tax rate is reduced to a common tax rate measure within the exchange, such as a percentage of expected revenue per standard advertising unit, e.g., for a given transaction, a percentage of expected cost per impression. Intelligent tax rate selection and support is optionally provided to automatically translate advertising goals of individual participants in the exchange to tax rates that make sense for the individual participants taking into account the tax rates expressed by other participants and their respective goals.

The invention thus dynamically auto-populates tax rates for participants to be applied to different participants to transactions within the exchange based on current market conditions and the dynamic goals set by participants in the exchange. Tax rates may be supported at the level of participant to participant within an exchange, at the level of exchange to exchange (e.g., a North American exchange versus an Australian exchange), at the level of participant to exchange, or vice versa.

The invention is a specialized case of normalizing utility functions that focuses on the specific subset of party preferences that apply to and have mappings to tax rates, which are objective functions. In this respect, each participant is given tax rate "knobs" that are viewable by other participants so that a more efficient understanding of the advertising market is understood by each of the participants when dealing with other participants. These knobs may include an import tax rate knob and an export tax rate knob. The online exchange (OLX) marketplace may also take a percentage of transactions and includes a knob for modifying the marketplace percentages for different transactions. The marketplace can also enforce limits on how far participants can turn their knobs.

In another embodiment, an online advertising exchange enables the erection of trade barriers between specific parties—similarly to the way that countries erect trade barriers between one another. The notion of an advertising import/export tax is thus introduced for an online advertising exchange. Since both sides of a transaction may be subject to import/export tax, the exchange of the invention operates to automatically normalize for such taxes in purchase price, thereby normalizing deficits with respect to one another. As a result, the invention operates to localize business in a global marketplace, even where a party is only an exporter or only an importer, or both.

In other non-limiting embodiments, decision support is provided for participants with respect to tax rate. For instance, based on market principles, when a global competitor floods a particular advertising market, the response is to increase the import tax to bring prices comparably close. In this regard, the import/export tax rate applied at any given moment can be determined dynamically and adjusted semi-automatically based on parameter adjustment for the tax rate. The decision support provided in accordance with the invention may be applicable to anti-dumping, arbitrage practices, etc., i.e., anywhere where global market practices may be impacted by competitive practices, participants can be assisted via decision support. In other words, for any set of constraints placed on advertising transactions that have an impact on the rational selection of a tax rate for one party vis-à-vis another party in an exchange, the invention automatically chooses optimal tax rates for the party given the constraints, taking into account the market conditions and the other party's selection of tax rates.

In other non-limiting embodiments, the invention enables an advertising exchange to track the performance of different selections of tax rates by each participant in the exchange, maintaining one or metrics, such as a quality, relevance or revenue metric, for the participant so that over time, participants' selection of tax rates becomes more optimal and in line with actual performance.

In various non-limiting embodiments, an advertising system to facilitate trading of advertising, such as a federated advertising exchange that provides a federated advertising layer for disparate advertising networks, includes (A) a publisher broker to represent publishers that determines an ask for an advertisement space on the publishers' inventory, such as a webpage, (B) an advertiser broker to represent advertisers that manages the advertisers' bids for the advertisement space to display the advertisers' advertisements and (C) an exchange to facilitate a transaction for the advertisement space between the publisher broker and the advertiser broker. As mentioned, the invention provides for selection and normalization of tax rates by different participants in the exchange consistent with their goals, as well as intelligent automatic tax rate selection for participants based on their goals.

A simplified overview has been provided in the present section to help enable a basic or general understanding of various aspects of exemplary, non-limiting embodiments that follow in the more detailed description and the accompanying drawings. This overview section is not intended, however, to be considered extensive or exhaustive. Instead, the overview presents some concepts related to some exemplary non-limiting embodiments of the invention in a simplified form as a prelude to the more detailed description of these and various other embodiments of the invention that follows.

Specifying/Normalizing Tax Rates in an Advertising Exchange

As mentioned in the background, currently, tax rates are applied by parties without any true understanding of the propagation of costs in the tax cycle for a transaction that result from a change in tax rate. In consideration of this deficiency, the invention enables the specification of tax rates by each party which are normalized according to standard tax rate representations in the exchange so that tax rates understood in an apples-to-apples fashion between disparate parties. By enabling comparisons of tax rate selections of different participants to transactions in the online exchange and exposing the comparisons to the different participants, the participants can view and modify the various tax rates (import, export, market, etc.) associated with the transactions in real-time.

FIG. 1A illustrates an exemplary implementation of an OLX 100 including a component 110 for normalizing import/export tax rates across disparate advertising entities engaged in an online advertising exchange 100. For instance, both first entity 102 and second entity 104 will trade on the exchange 100 according to a set of utility functions, all or a subset of which may have an impact on what an optimal import or export rate for the entities 102 or 104, or both, may be. In such a case, component 110 captures the different expressions of utility as pertaining to tax rate from the two different entities, and normalizes the tax rate expressions by the different entities 102, 104 to a common measure, such as percentage of expected transaction outcome, e.g., percentage of revenue. Once the expressions are normalized, an effective import tax rate and an effective export tax rate is determined for entities 102, 104 for given transaction(s) between them that meets the conditions imposed by their utility functions that affect tax rates as expressed by the different entities 102, 104, respectively. The invention thus operates to automatically determine and apply optimal tax rates between two parties to a transaction conducted in exchange 100 based on their utility functions to the extent their utility functions express a tax bias for interacting in exchange 100. A more efficient marketplace is achieved between participants within an exchange as a result.

Figure 1B:
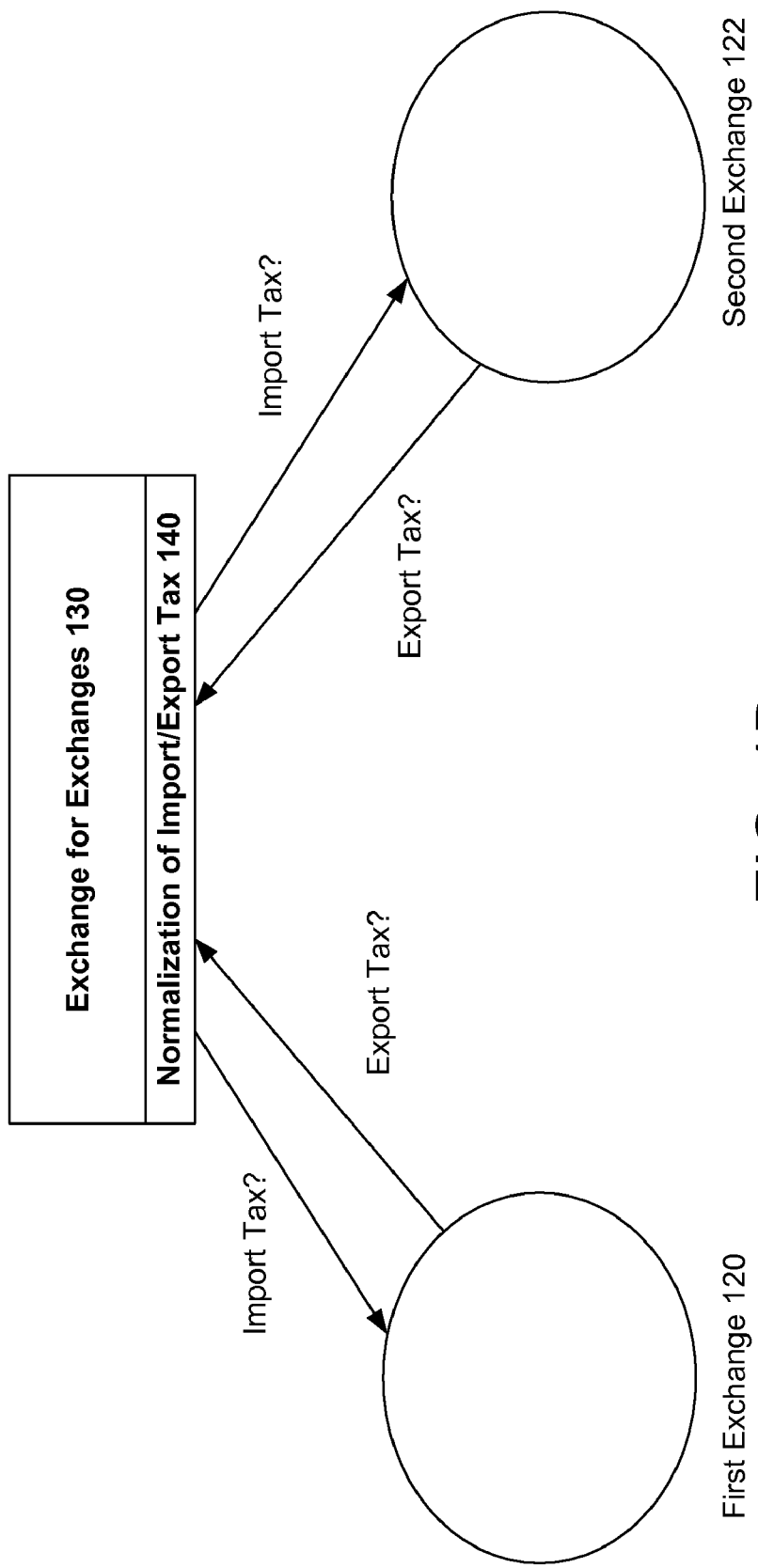

FIG. 1B illustrates that tax rates normalized and determined in accordance with the invention can be on an exchange to exchange basis in addition to a participant to participant basis such as shown in FIG. 1A. For instance, one may imagine a first set of disparate advertising networks comprising a first exchange in South America and a second set of disparate advertising networks comprising a second exchange in Japan, where the exchanges operate to tax one another at an exchange to exchange level.

Thus, as shown in FIG. 1B, an exemplary non-limiting implementation of an "Exchange for Exchanges" OLX 130 may include a component 140 for normalizing import/export tax rates across disparate advertising entities engaged in an online advertising exchange 130. For instance, both first exchange 120 and second exchange 122 will trade on the exchange 130 according to a set of utility functions, all or a subset of which may have an impact on what an optimal import or export rate for the exchanges 120 or 122, or both, may be. In such a case, component 140 captures the different expressions of utility as pertaining to tax rate from the two different exchanges, and normalizes the tax rate expressions by the different exchanges 120, 122 to a common measure, such as percentage of expected transaction outcome, e.g., percentage of revenue. Once the expressions are normalized, an effective import tax rate and an effective export tax rate is determined for exchanges 120, 122 for given transaction(s) between them that meets the conditions imposed by their utility functions. The invention thus operates to automatically determine and apply optimal tax rates between two different exchange for transactions conducted in super-exchange 130 based on their utility functions to the extent their utility functions express a tax bias for interacting in super-exchange 130. A more efficient marketplace is achieved between exchanges as a result by setting tax rates to optimal values.

FIG. 1C in turn illustrates an exemplary implementation of an OLX 100 including a component 140 for normalizing import/export tax rates across disparate advertising entities and exchanges engaged in an online advertising exchange 130. For instance, both a first exchange 120 and a participant 124 of a second exchange 122 will trade on the exchange 130 according to a set of utility functions, all or a subset of which may have an impact on what an optimal import or export rate for the exchange 120 or participant 124, or both, may be. In such a case, component 110 captures the different expressions of utility as pertaining to tax rate from the exchange 120 and participant 124, and normalizes the tax rate expressions by the exchange 120 and participant 124 to a common measure, such as percentage of expected transaction outcome, e.g., percentage of revenue. Once the expressions are normalized, an effective import tax rate and an effective export tax rate is determined for exchange 120 and participant 124 for given transaction(s) between them that meets the conditions imposed by their respective utility functions. The invention thus operates to automatically determine and apply optimal tax rates between two parties to a transaction conducted in super-exchange 130 based on their utility functions to the extent their utility functions express a tax bias for interacting in super-exchange 130. A more efficient marketplace is achieved between participants and exchanges as a result, and vice versa. In various non-limiting embodiments, the invention thus operates to normalize tax rates as expressed by participants and/or exchanges according to their utility functions for advertising transactions between the participants and/or exchanges.

Figure 2A:
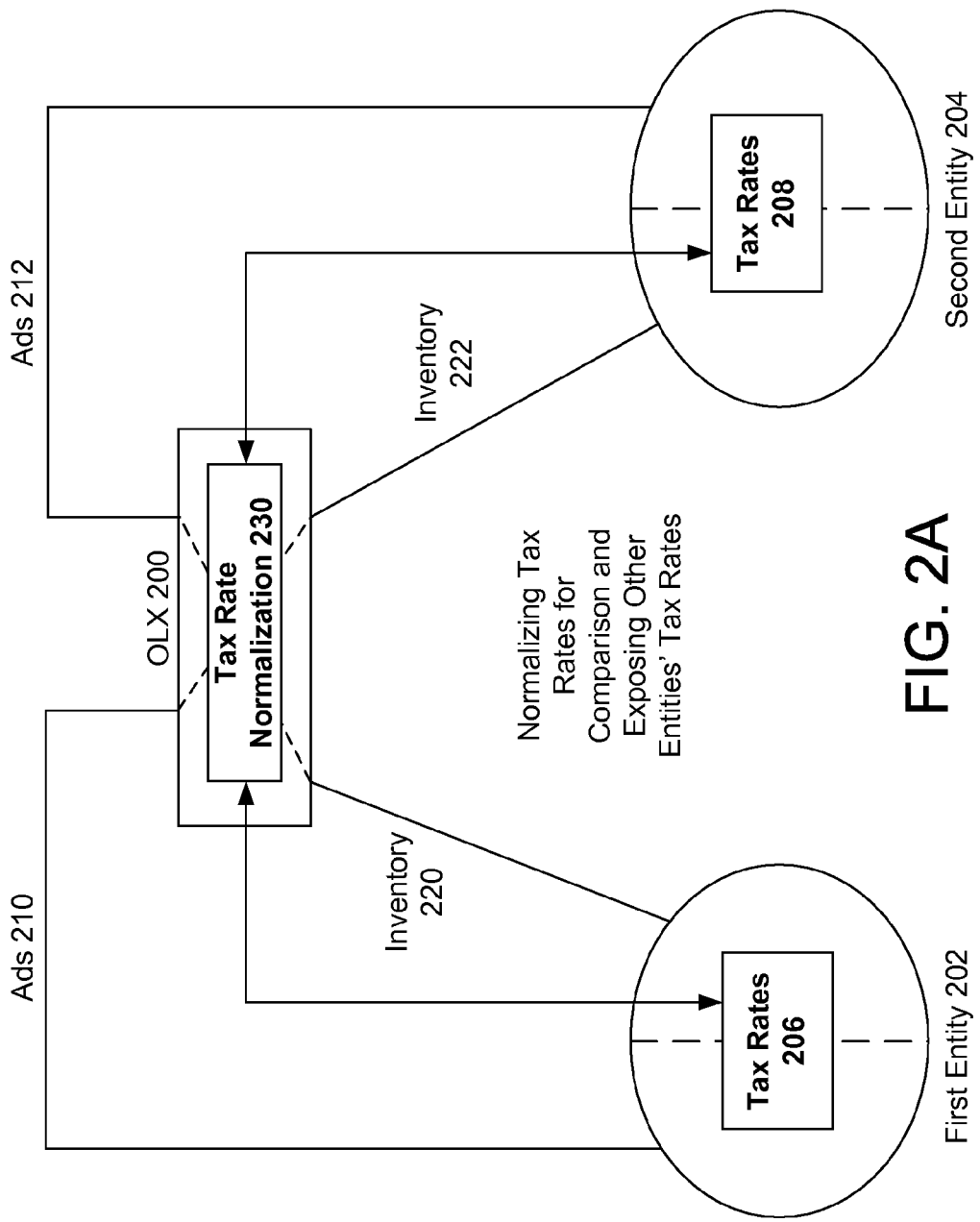
FIGS. 2A, 2B and 2C illustrate exemplary non-limiting embodiments for specifying and normalizing tax rates or fees according to various utility functions expressed by participants as translated to tax rates or fees in accordance with the invention.

FIG. 2A illustrates a general architecture for an advertising exchange 200 in accordance with the invention for normalizing tax rate expressions of different entities 202, 204, which may be any party to a transaction in exchange 200. In this regard, first entity 202 may include an advertiser side that brokers ads 210 in the exchange 200 and/or a publisher side that brokers advertising inventory 220. Similarly, second entity 204 may include an advertiser side that brokers ads 212 in the exchange 200 and/or a publisher side that brokers advertising inventory 222. In this regard, entities 202, 204 may express one or more utility functions applying to any transactions between the entities 202, 204 and exchange 200, as well as to transactions between the first entity 202 and the second entity 204, or vice versa. In accordance with the invention, these utility functions are reduced to set of utility functions that affect tax rate selection for the parties to transactions in the exchange 200. This yields tax rate utility function 206 for first entity 202 and tax rate utility function 208 for second entity 204. A normalizing layer 230 of the exchange 200 operates to normalize any differences in tax or transaction model used to express a tax or penalty or reward for transactions in the exchange.

Figure 2B:
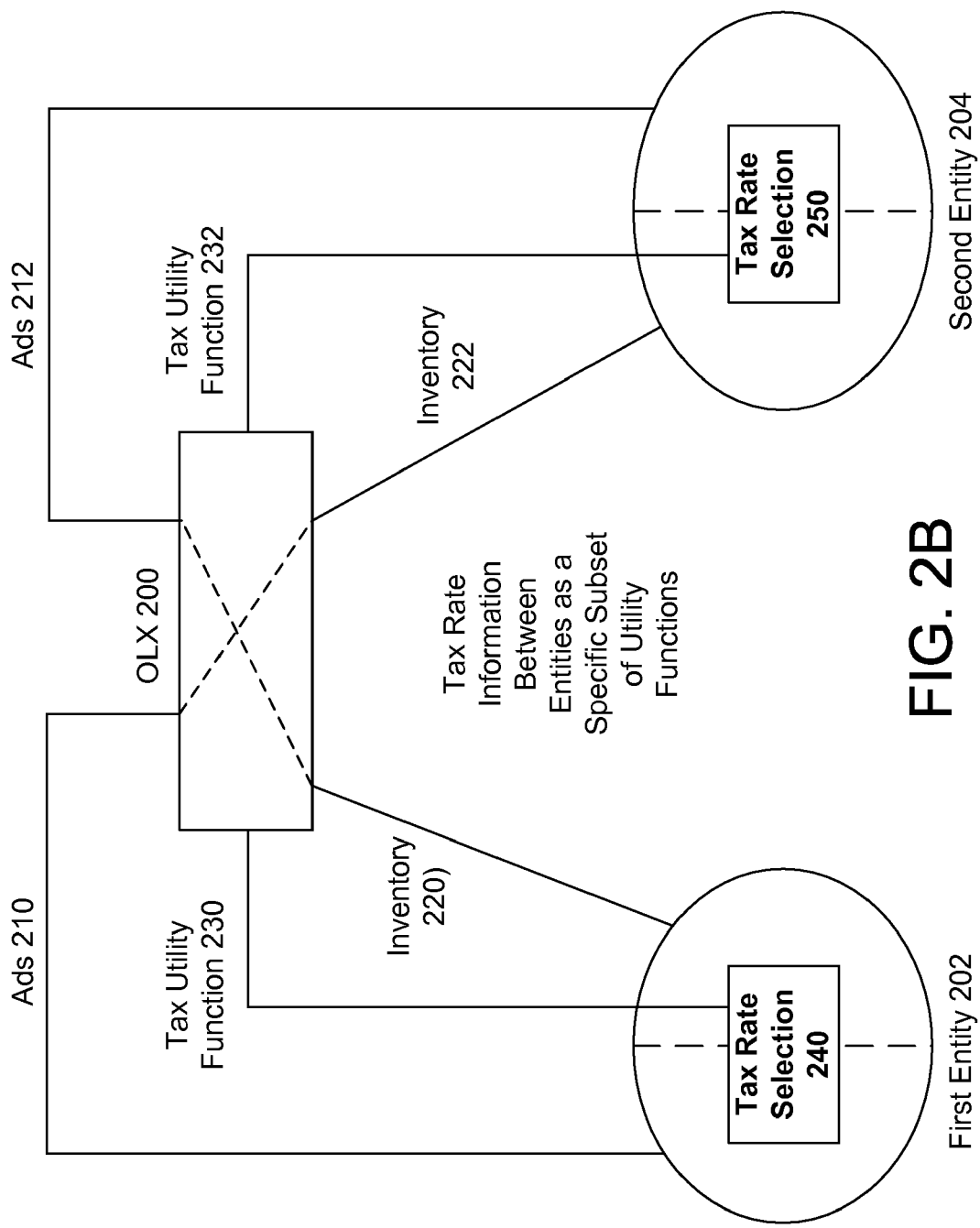

This is illustrated in FIG. 2B, i.e., once tax rate utility functions 206, 208 from FIG. 2A are normalized to tax utility function 230 and tax utility function 232 for entities 202 and 204, respectively, tax utility functions 230, 232 can be directly compared, which enables optimal tax rates to be selected for entities 202 and 204 by tax rate selection component 240 and 250, respectively, in accordance with the invention. Exchange 200 may also determine the optimal tax rates for the transactions between the entities 202 and 204 as well. In this respect, once the tax rate utility functions of the respective participants of the exchange are normalized, and thus comparable, optimal tax rates can be set for transactions involving those participants that satisfy respective utility functions.

In one embodiment, parties are given a set of tools to specify utility functions that may impact import tax rate or export tax rate, either directly or indirectly. For instance, the tools could be used to explicitly raise or lower import or export tax rate by a party, and/or the tools could ask policy based questions about how the party wishes to behave with respect to certain other classes of parties in the exchange, or with respect to specific parties, or with respect to all transactions in the exchange. The output of the tool thus determines effective import tax rate and an effective export tax rate for the party, as mentioned, either directly, or through a transformation of other utility functions that have a relationship with import tax rate or export tax rate. Conceptually, as illustrated by the block diagram of FIG. 2C, such tools can be thought of as utility function "knobs" that pertain to tax rates for a party to the exchange, although any subject, service, application, component, etc. may determine tax rates for the party in accordance with the invention.

Figure 2C:
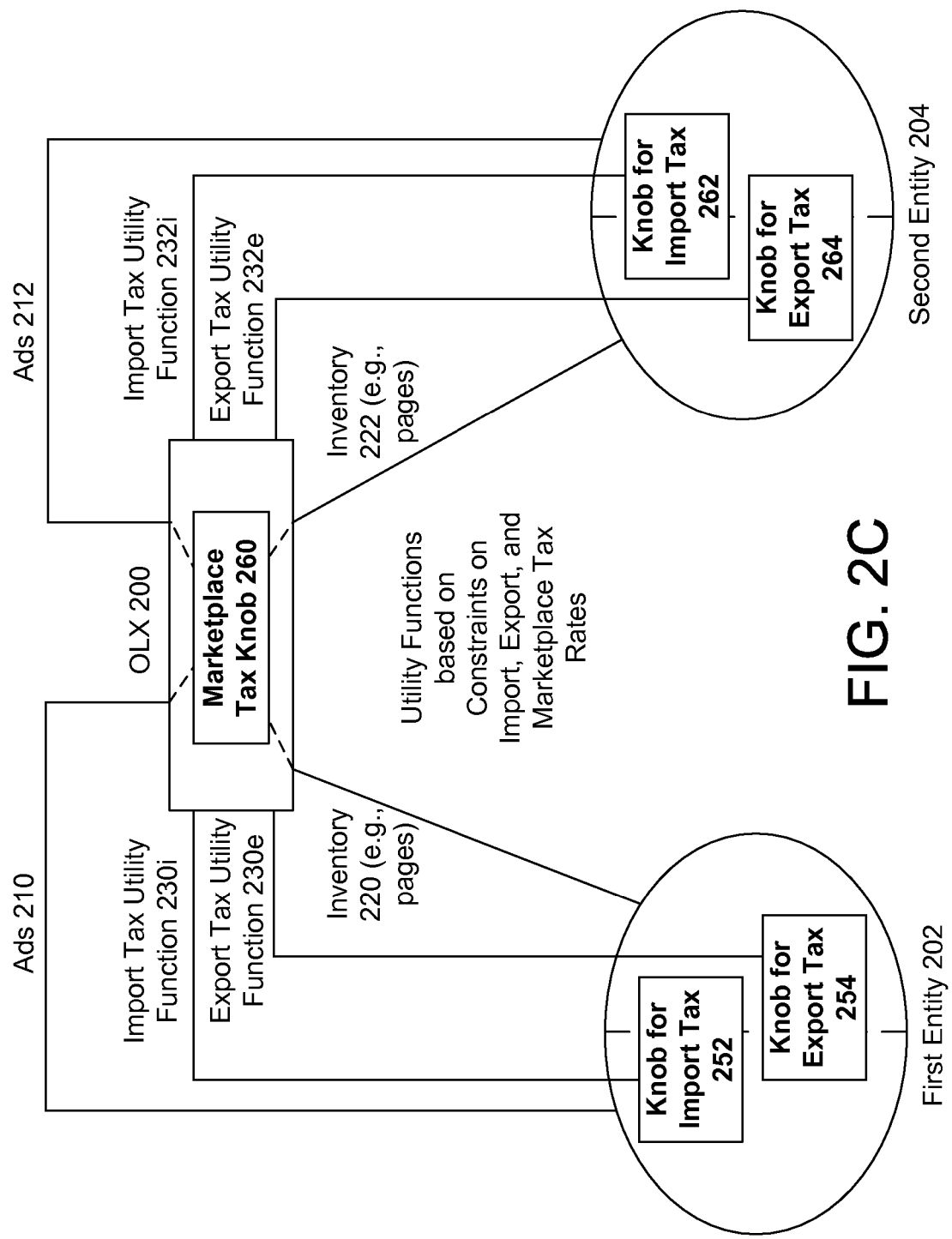

FIG. 2C shows a knob 252 for import tax and a knob 254 for export tax for first entity 202, and a knob 262 for import tax and a knob 264 for export tax for second entity 204. As mentioned, conceptually, one way the knobs of the entities 202, 204 can be set or modified is by automatically normalizing the utility functions specified by the entities 202, 204 that bear on tax rates for transactions in the exchange 200, comparing those normalized expressions, and then automatically setting optimal tax rates for transaction(s) between entities 202, 204. Another way the knobs can be set or modified is by having the parties explicitly turn the knobs in order to increase or decrease a particular tax rate. For instance, a party may simply wish to increase the import tax or decrease the export tax being used for a given set of transactions directly, despite what exchange 200 may determine are the optimal tax rates for the party. Either way, whether effective tax rates are specified indirectly through one or more policy based expressions of tax rates via utility functions input to the exchange, or directly via explicit tax rate settings or modifications, effective import tax utility functions are formed for the parties for transactions in the exchange 200. For instance, first entity 202 has an effective import tax utility function 230*i* and an effective export tax utility function 230*e* with respect to transactions with second entity 204 in exchange 200. Similarly, second entity 204 has an effective import tax utility function 232*i* and an effective export tax utility function 232*e* with respect to transactions with first entity 202 in exchange 200. The choices for tax rates are selected to be optimal by being able to compare the objectives with respect to tax rates within the normalized layer for tax rates provided by an exchange in accordance with the invention.

In addition, as alluded to earlier, exchange 200 itself may have a marketplace tax associated with transactions within its interior, an outward facing tax that penalizes any non-exchange members or other exchanges, and/or some other policy that explicitly or implicitly expresses a tax in connection with transactions in OLX 200. For such marketplace tax rates, the invention enables marketplace knob settings that can be explicitly set or modified for exchange tax rate knobs 260, or knob settings that are implicitly specified by placing limits on transactional fees via policies expressed as utility functions for exchange 200.

As mentioned, for a multi-party advertising exchange, the invention is a specialized case of normalizing utility functions for each exchange participant that distills all of the party specific preferences, such as quality, relevance, biases, etc. and focuses on the specific subset of party preferences that are the effective tax rates, which are objective functions. Each participant is given tax rate 'knobs' that are in effect viewable by other participants so that a more efficient understanding of the advertising market is understood by each of the participants when dealing with other participants. These knobs include an import tax rate knob and an export tax rate knob. The online exchange (OLX) marketplace may also take a percentage of transactions and may include a knob for modifying the marketplace percentages for different transactions. The marketplace can also enforce limits on how far participants can turn their knobs.

In this respect, there are a lot of different ways to express or specify a utility function that may have an impact on a "tax rate" relevant to a transaction between participants in an advertising exchange. Obvious examples include, but are not limited to: (1) a flat fee for transactions (e.g., $0.10 per transaction), (2) a percentage of actual or expected revenue represented by transactions (e.g., 1% of revenue of transactions), (3) a percentage of actual or expected profit materializing from transactions (e.g., 2% of profit from transactions), (4) a percentage of actual or expected return on investment (ROI) or (5) any other mathematical expression of monetary extraction from a transaction-based financial flow within the exchange. A less obvious example may be a policy based expression such as "I want to greatly discourage doing business with low quality advertisers" that implicitly specifies a tax rate or penalty on certain transactions.

Figure 3:
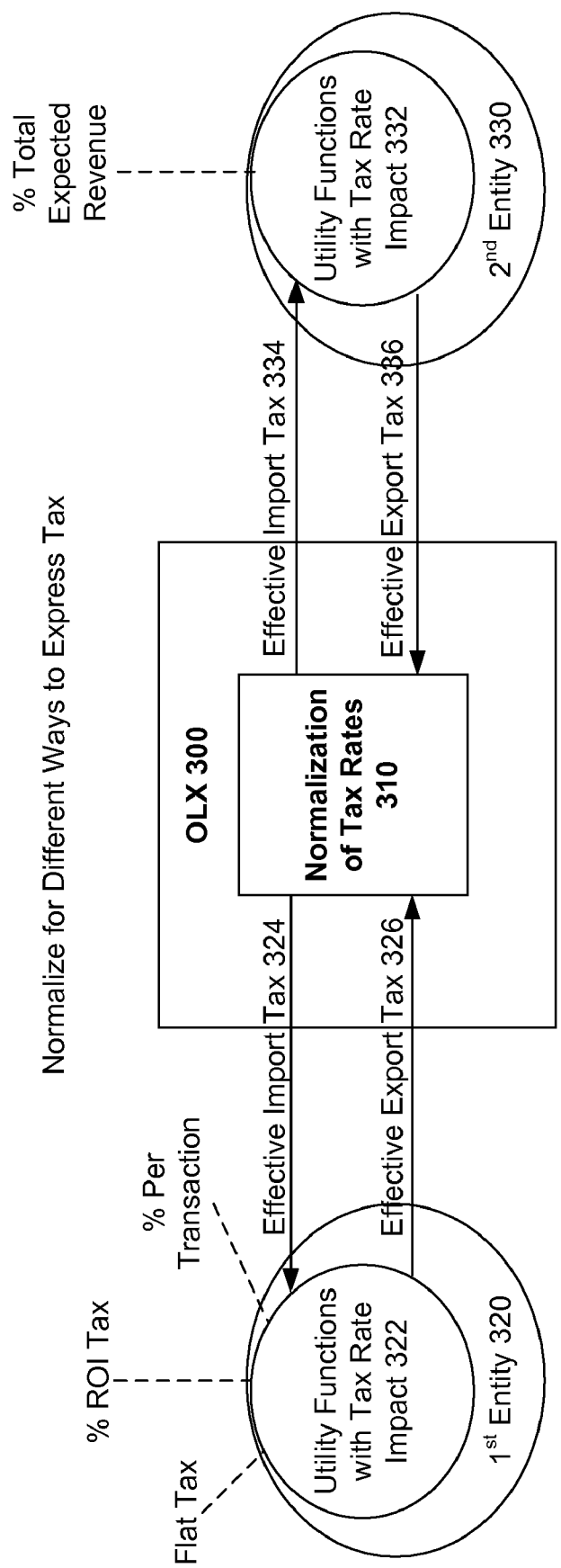
FIG. 3 is an exemplary, non-limiting block diagram showing normalization of taxes expressed across different transaction models in accordance with the invention.

The notion of normalizing all different kinds of expressions for tax rates is illustrated in FIG. 3 between two entities 320 and 330, though any number of entities may be involved in transactions in OLX 300. As described above in connection with FIGS. 2A, 2B and 2C, the invention includes a normalization layer 310 for tax rates that receives different expressions of tax rates, normalizes them, and determines optimal effective import tax 324 and effective export tax 326 for first entity 320, and determines optimal effective import tax 334 and effective export tax 336 for first entity 330 that are consistent with their utility functions. In this respect, each entity 320, 330 has a set of utility functions 322, 332, respectively, which directly or indirectly impact tax rate. Advantageously enabled by normalization layer 310, these utility functions 322, 332 can be expressed differently by different participants. As long as the expressions are translatable to a common measure of expected value of the tax, the different utility functions of different parties can be manifested in terms of optimal tax rates 324, 326, 334, 336.

Thus, as shown in FIG. 3, the first entity 320 might include a policy expressed as flat tax, another policy expressed as a percentage of return on investment, and yet another policy expressed as a percentage of transactions tax. In a different vein, second entity 330 may simply express the entire tax utility function as a percentage of expected revenue. Since all of these tax expressions can be mapped to a common measure for expected transactional value by normalizing layer 310, beneficially different participants are free to express tax rate policies in different terms.

In addition, there are also a lot of different pricing models by which a participant in an exchange may express a tax rate directly, or indirectly, via a utility function having an impact on tax rate in accordance with the invention. In this regard, the normalization layer of the invention takes these different pricing models into account when normalizing different tax rate utility expressions from participants in the exchange. For instance, some exemplary non-limiting pricing models that participants may use to specify a utility function having a bearing on a tax rate for the participant include: cost per click (CPC), cost per impression (CPI), also known as cost per thousand impressions (CPM), cost per acquisition (CPA), or return on investment (ROI). In one embodiment, different pricing models are equated to one another by way of statistical mathematics to compensate for the different amount of risk involved by the different expressions by tying each pricing model to a common measure for expected outcome for transactions, such as expected revenue.

Figure 4:
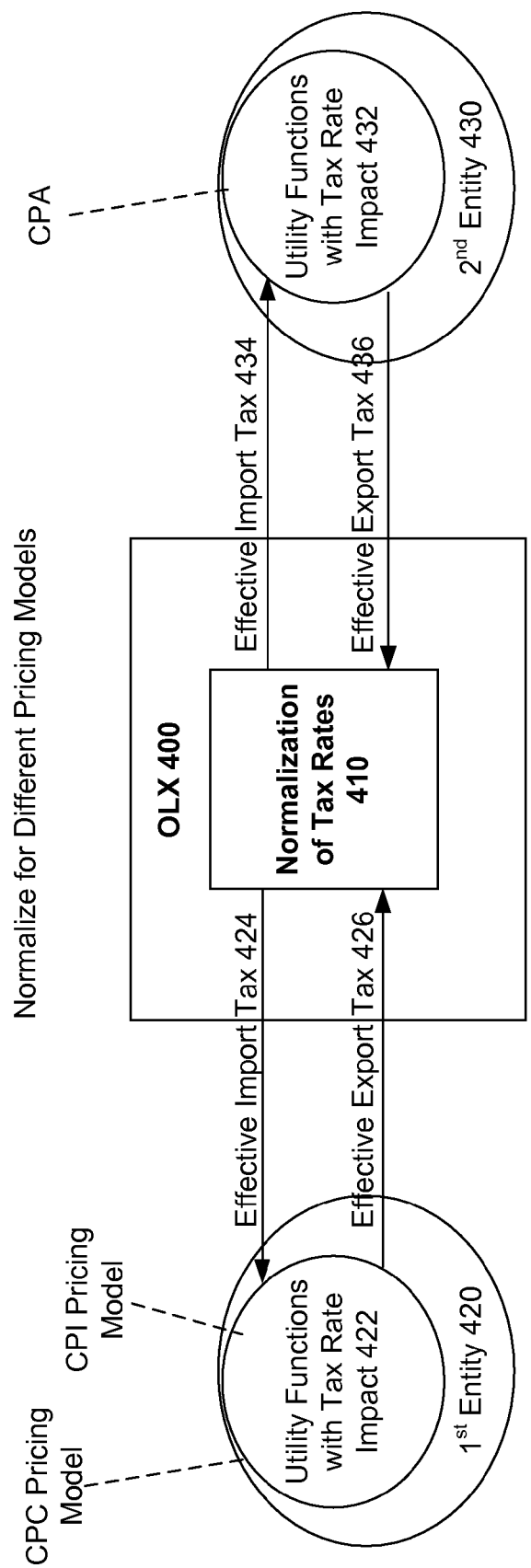
FIG. 4 is an exemplary, non-limiting block diagram showing normalization of taxes expressed across different advertising pricing models in accordance with the invention.
Figure 5:
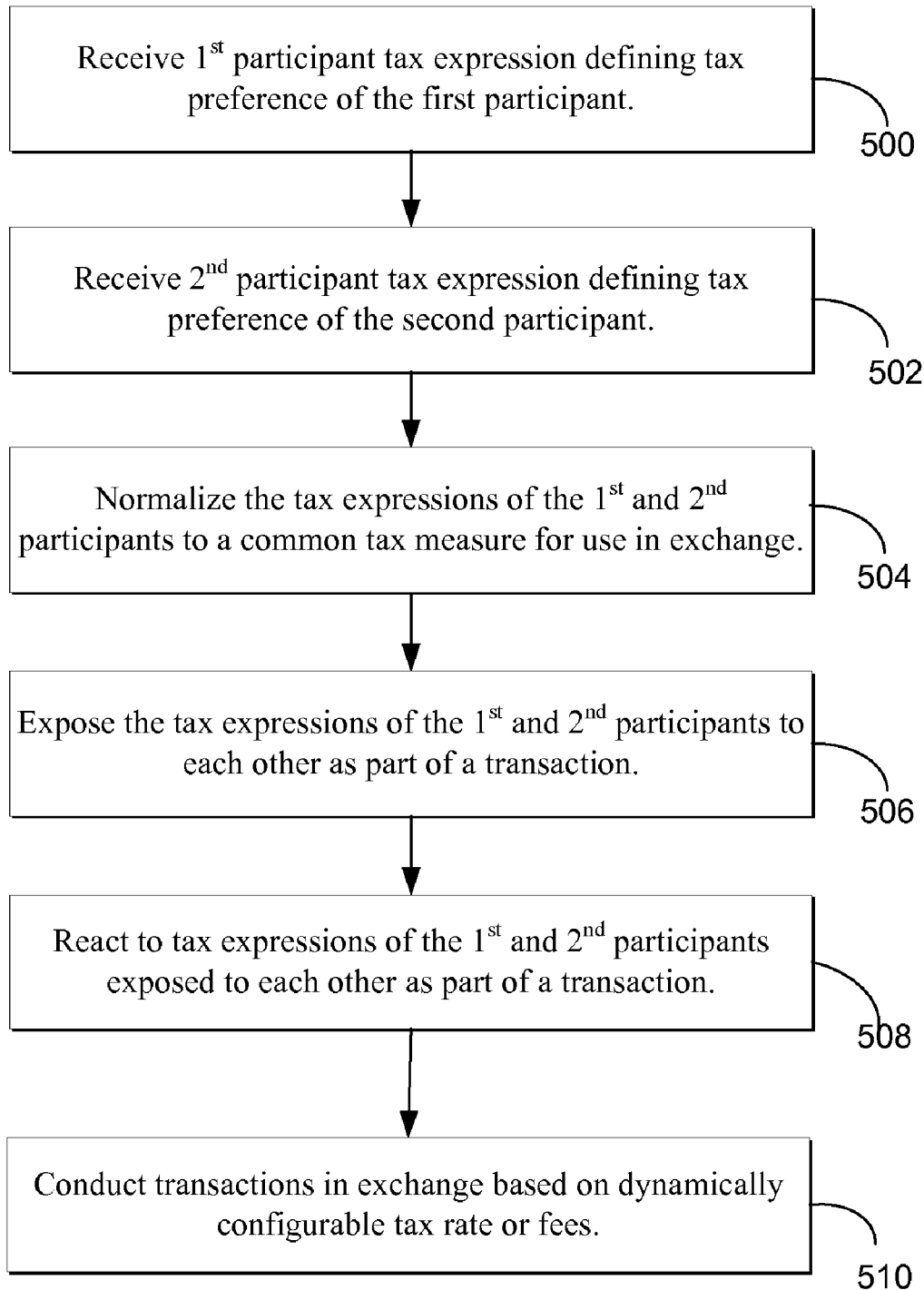
FIG. 5 is an exemplary flow diagram illustrating a process for normalizing tax rate expressions in accordance with the invention.

The mathematical equation of different pricing models may be performed by normalizing layer 410 of an OLX 400, as shown in exemplary, non-limiting fashion in FIG. 4. As with FIG. 3, a first entity 420 and a second entity 430 have utility functions with tax rate implications 422 and 432, respectively, which when normalized by normalizing layer 410 of OLX, can be compared directly. In this embodiment, different pricing models underlying different utility functions 422, 432 are normalized by normalizing layer 410. In the example, for instance, first entity 420 specifies a first utility function impacting a tax rate according to a CPC pricing model, and a second utility function impacting a tax rate according to a CPI model, whereas entity 430 specifies all tax terms according to a CPA model. Despite participants expressing different pricing models, however, the invention operates to normalize the expressions so that comparisons of different participants' tax rate expressions can be made by the exchange 400.

As yet another exemplary, non-limiting example, assuming all bids are normalized to revenue per impression (RPI) in accordance with a normalizing layer provided in accordance with the invention and bids are represented at true cost. Then, with respect to import fee (iFee), in one embodiment, there is a traffic acquisition cost (TAC) that a publisher broker (PB) charges other advertiser brokers (ABs) that is added to the RPI before the merge sort takes place that operates as an import fee (or tax). In one non-limiting embodiment, import fees (or taxes) may be determined solely by PBs and are dynamically adjustable.

With respect to export fees (or taxes), such eFees represent the margin that an AB takes for matching, which in practice may be added to RPI before the merge sort. In one non-limiting embodiment, export fees are determined solely by ABs and are dynamically adjustable.

iFees can thus be used by a PB to manage how other AB advertisers appear in the PB's system. For instance, for a PB to offer advertisers exclusive access to the PB's inventory, or to prevent other AB's ads from appearing on the PB's site, or if a competitor starts subsidizing advertisers (flooding the market), the PB can increasing the iFee for certain parties enabling management of how influence advertisers can have in terms of impacting the system.

Similarly, eFees can be set against different participants to a transaction by an AB to manage risk. For instance, an AB can make choices for eFees in order to ensure a fair TAC, in order to trade off breadth of inventory for revenue, or to be rewarded for having better technology. Thus, the choice of eFee by an AB allows optimization of revenue or breadth, with competitive external ad systems effectively providing a "reality check" on market value.

As another example of usage of import and export fees in accordance with the invention, a tool is provided for managing risk in transactions with respect to quality. For instance, if another participant to a transaction is known to have poor quality advertisers, then a participant sets the iFee to where the revenue justifies the inferior quality.

For yet another example of usage of import and export fees in accordance with the invention, if another participant to a transaction is known to have poor quality traffic, then a participant sets the eFee to where the revenue offsets the losses. Thus, in the presently described embodiments, policy based decision making is represented by one or more utility functions, which are reducible or translatable to a set of tax rate choices for transactions vis-à-vis other parties in an exchange. For instance, the following non-limiting examples represent policies that an advertising entity or publishing entity may wish to express, which have the following corresponding tax consequences.

"Minimize competitors on own inventory" ←→Import Fee high

"Maximize revenue" ←→Import Fee low

"Derive value from high performing ads" ←→Export Fee high

"Maximize volume for own advertisers" ←→Export Fee low

Other high level goals that a participant may want to pursue as part of an automatic tax rate setting in accordance with the invention may include "Retain my audience," "Maximize revenue over all other factors," "Protect advertiser relations," "Optimize relevance," "Optimize user satisfaction," "Reward mom+pop operations," "Emphasize sports," "Display only name brands," etc. One can see that the list is limitless, especially considering combinations and permutations of such goals. Thus, a participant can specify a set of policies for interacting in the exchange and due to the normalizing layer of the invention, the tax rates are automatically set for the participant to reflect the participant's goals relative to the goals of other participants. Moreover, if the participant is dissatisfied with the current set of tax rates being applied, the participant can change them for a variety of reasons to meet a changing set of marketplace conditions. For instance, a previously friendly company may have become a competitor in the marketplace, requiring a change in tax rate strategy applied to that competitor not entirely consistent with other goals, so the participant changes the tax rates that apply to that competitor.

In this respect, in one embodiment, the invention is implemented as a constraint/optimization problem. In this regard, each participant has a set of goals in advertising transactions that may actually work against maximizing revenue (e.g., a goal that maximizes longer term revenue), and yet within those constraints, the participant would still like to make some money. Accordingly, policies expressed in accordance with the invention that have tax consequences can be thought of as constraints, within which revenue should be optimized for each party. For example, if a party does not want "mom+pop" operations advertising on the party's site, then that is a constraint that party is placing on revenue. The party is, in essence, saying "as long as it is not a mom+pop operation, I want to maximize my revenue." Thus, the tax rates that are automatically set for transactions in the exchange reflect the constraint/optimization profile for each participant in accordance with the invention.

Further building on this idea that policies or utility functions selected by participants for transactional behavior in an advertising exchange have a translation to tax terms (fee, percentage, etc.), in another non-limiting embodiment, an online advertising exchange enables the erection of trade barriers between specific parties—similarly to the way that countries erect trade barriers between one another.

The notion of an advertising import/export tax is thus introduced for an online advertising exchange. Since both sides of a transaction may be subject to import/export tax, the exchange of the invention operates to automatically normalize for such taxes in purchase price, thereby normalizing deficits with respect to one another. As a result, the invention operates to localize business in a global marketplace, even where a party is only an exporter or only an importer, or both, making for better rational economic behavior by all parties.

The invention thus makes the advertising marketplace more efficient by automatically driving commerce for online advertising in the exchange to more optimal tax rate choices by the participants by enabling dynamic adjustment of tax rates or fees applied to other participants, from an import or export standpoint, thereby helping participants behave with directed personal policies for their transactions in the exchange.

Overall, increasing the amount of knowledge in the ecosystem of the advertising exchange makes for more efficient transactions since knowledge can reduce uncertainty and risk in decision making by the parties, both in terms of gaining a competitive advantage in a transaction by knowing something others do not know, or by having more consistent expectations for transaction results. In this respect, the invention increases the ability of participants to an advertising exchange to make more rational decisions about advertising transactions vis-à-vis normalized tax rate expressions exposed to participants in an exchange. As a result, the advertising marketplace is better defined between individual participants, making for more efficient and rational transactions among those participants, thereby yielding a more efficient marketplace for all.

In various non-limiting embodiments, an advertising system to facilitate trading of advertising, such as a federated advertising exchange that provides a federated advertising layer for disparate advertising networks, includes (A) a publisher broker to represent publishers that determines an ask for an advertisement space on the publishers' inventory, such as a webpage, (B) an advertiser broker to represent advertisers that manages the advertisers' bids for the advertisement space to display the advertisers' advertisements and (C) an exchange to facilitate a transaction for the advertisement space between the publisher broker and the advertiser broker. As mentioned, any of publisher brokers, advertiser brokers, or the exchange itself, can specify one or more tax rates explicitly or implicitly, which are normalized by the exchange for comparison by and exposure to the participants to a transaction. Knobs are provided for publisher brokers, advertiser brokers, or the exchange to change the tax rates explicitly, or policies can be expressed that change tax rates for a participant implicitly. As a result of the normalization capability, the tax rates can be automatically set to reflect the goals of the participants in transactions in the exchange.

Decision Support for Tax Rate Selection

Moreover, oftentimes, when there are multiple advertisers bidding for the same publisher space, or when multiple publishers are competing for the same advertisers, each participant to the transaction may have different utility functions, which today manifest themselves in a variety of ways, and according to a variety of biases. Yet, there is no way for participants to automatically map their different utility functions to a sensible import or export tax rate selection, let alone, as part of an automatic mapping that dynamically changes in response to all other participants' tax rates. In other words, what is desired is a way to specify goals for advertising transactions that are automatically taken into account when populating tax rates for party transactions, and which is dynamically updated when other participants' tax rates are changed as a result of changing market conditions or changing utility functions of the other participants.

Figure 6:
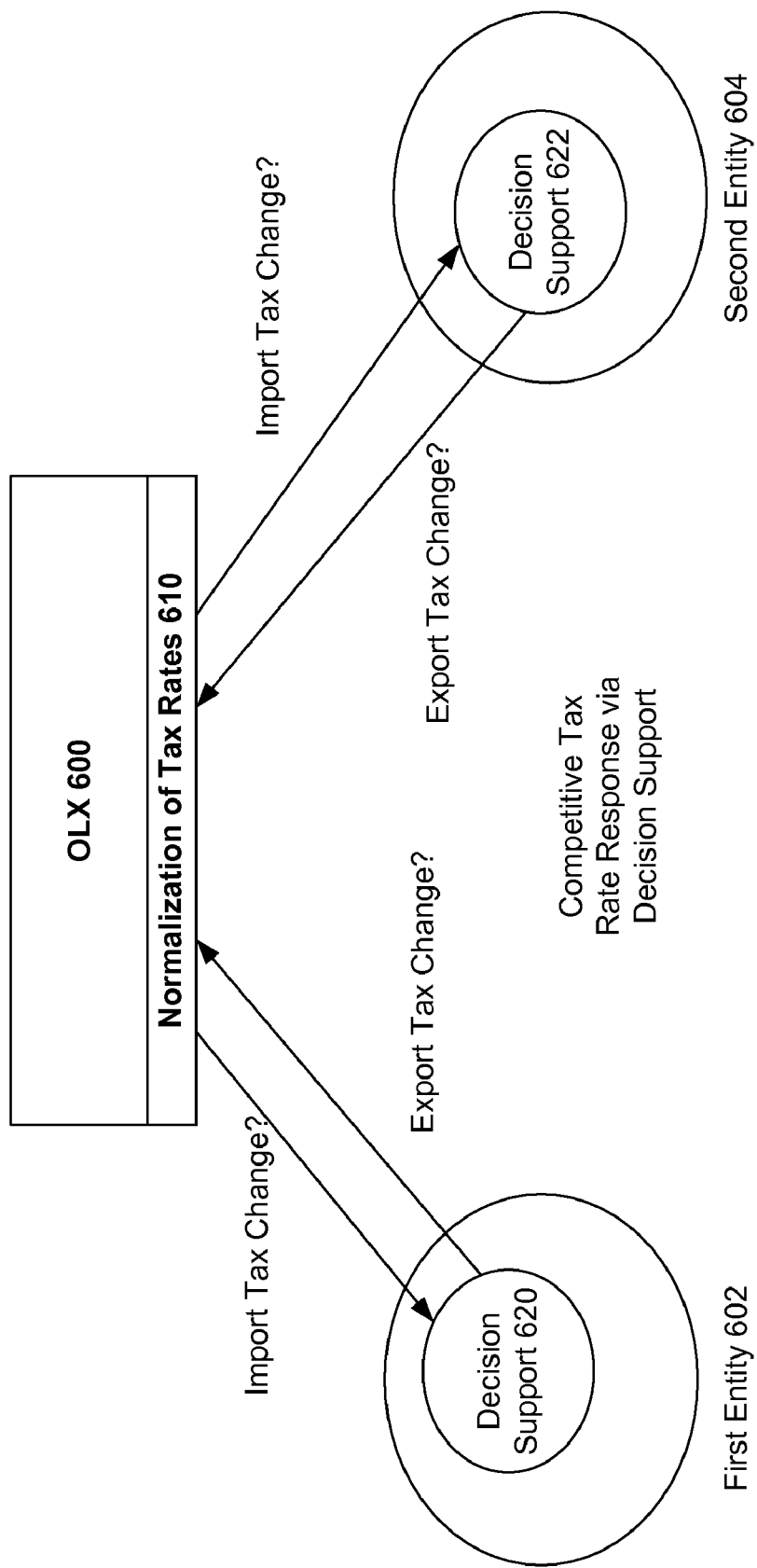
FIG. 6 is a block diagram illustrating exemplary aspects of decision support for tax rates in accordance with the invention.

These overall concepts are shown in the block diagram of FIG. 6 wherein an exchange 600 includes a normalization layer 610 as described above for giving a unified view of taxes across participants in the exchange. To help achieve intelligent decision making, the invention provides decision support 620 and 622 for entities 602 and 604, respectively. Decision support modules 620 or 622 can help entities 602 or 604, respectively, set tax rates in accordance with their respective policies and goals in the exchange 600 and also take into account reactive measures against market conditions, or retaliatory economic measures taken by competitor while trading.

Figure 7:
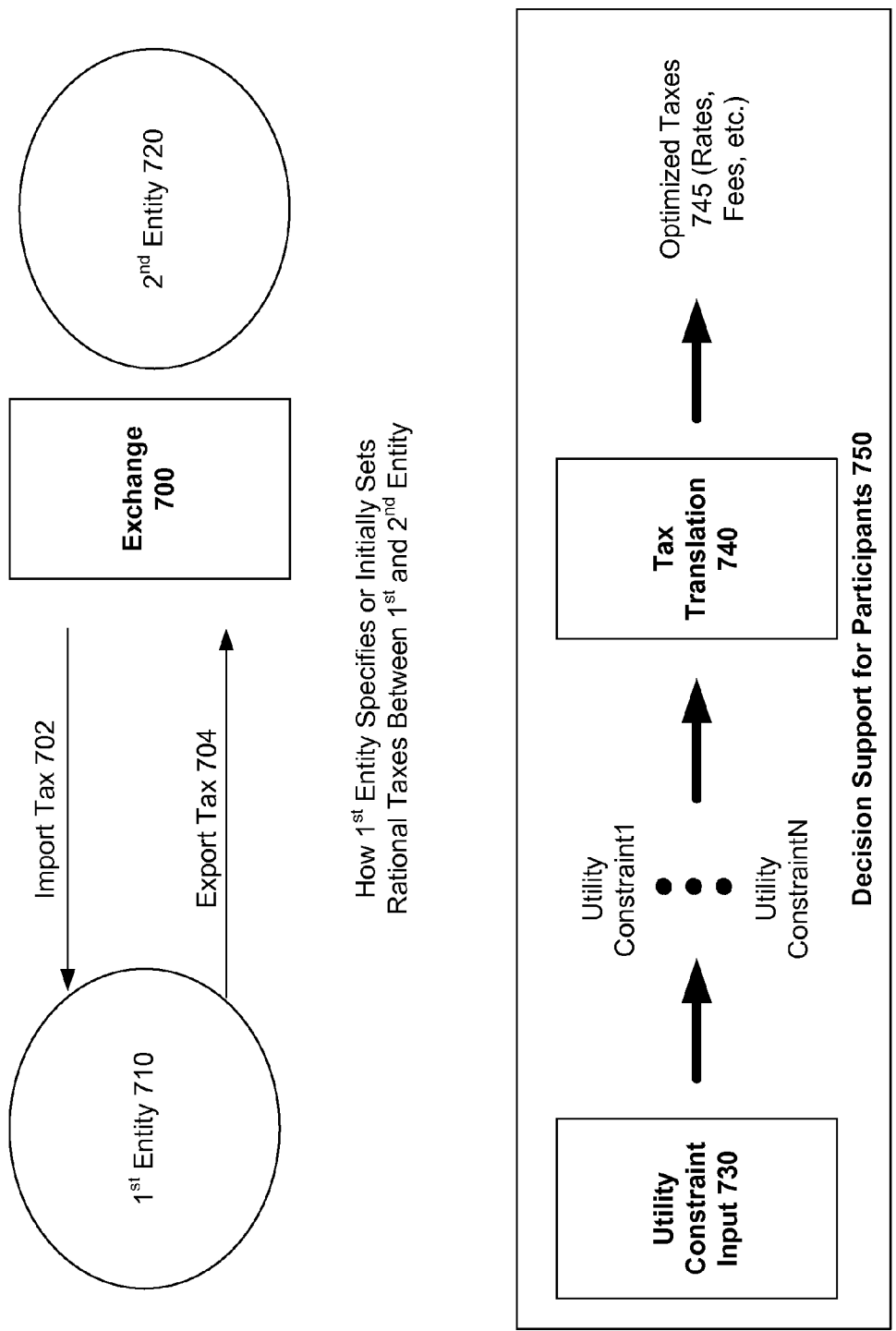
FIG. 7 is a block diagram illustrating exemplary aspects of decision support for tax rate selection in accordance with the invention.

When one takes into consideration the myriad of other types of biases an advertiser or publisher may exhibit (e.g., preference for relevance, preference for quality, preference for time of day, preference for ecologically sound companies, etc.) in an exchange as part of an expression of their utility function, and that these preferences change over time, today, there is simply no way for participants to rationally set appropriate tax rates that address those preferences, let alone automatically. Accordingly, as shown in FIG. 7, the invention provides a way for a first entity 710 in an exchange 700 to set import tax 702 and export tax 704 with respect to other participants, such as second entity 720 in accordance with policies and objectives. For instance, in one embodiment of decision support for participants 750, a participant enters a set of utility constraints via input 730 (e.g., via questions, a form, an application, service, etc.) and those utility constraints are translated to tax terms 745 by component 745 which are optimal for the set of constraints.

Figure 8:
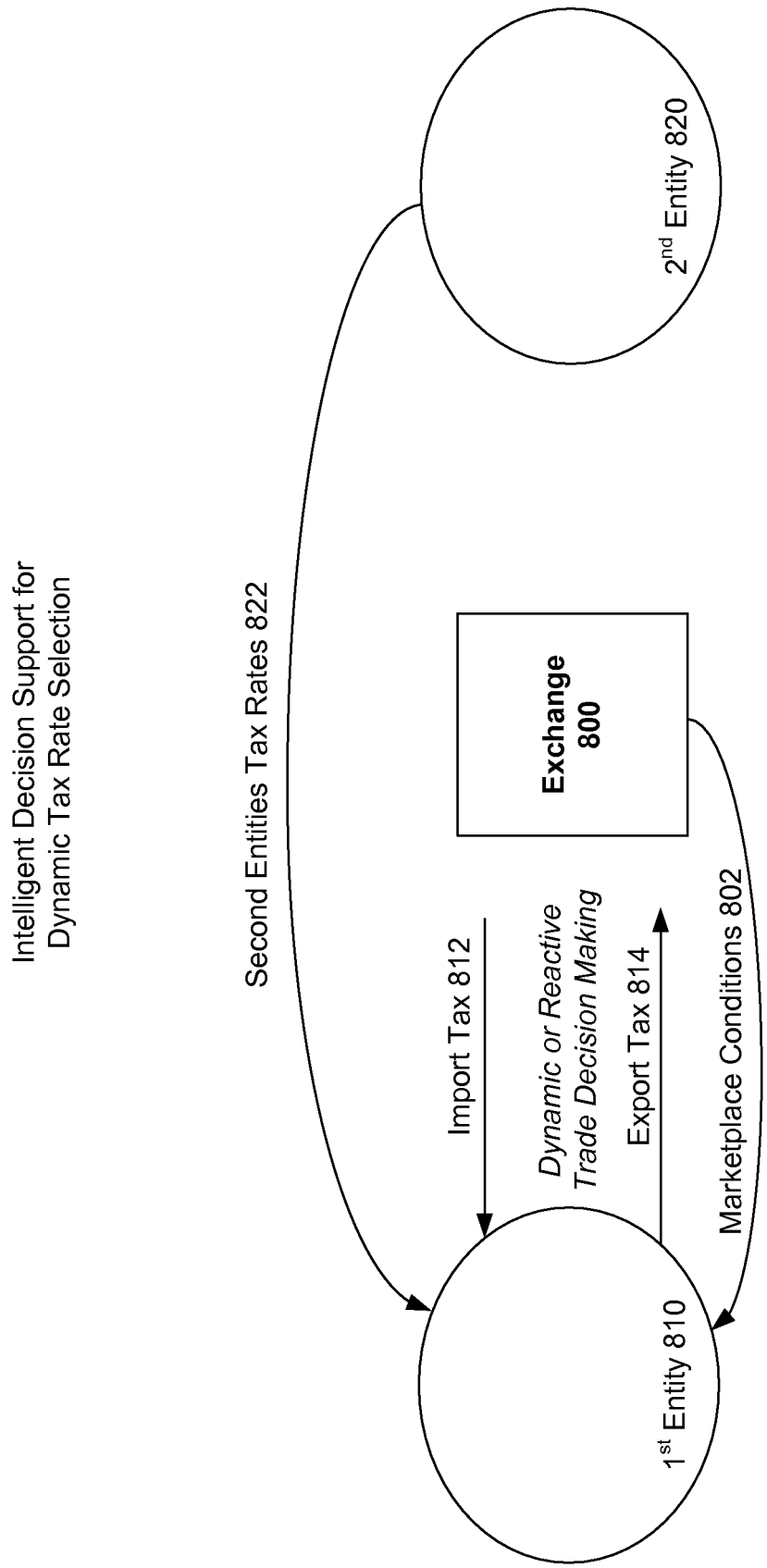
FIG. 8 is a block diagram illustrating exemplary aspects of decision support for dynamic tax rate selection based on external factors in accordance with the invention.

In addition to setting import and export tax rates for each participant of an advertising exchange, other embodiments of decision support for tax rate in accordance with the invention operate to automatically adjust those tax rates based on ever evolving specific utility function(s) specified by participants of the advertising exchange. This is illustrated in FIG. 8 wherein a first entity 810 trades with other entities, such as second entity 820, in exchange 800. In this embodiment, after first entity 810 specifies an initial tax posture vis-à-vis other participants in accordance with the utility functions specified by the first entity 810, the import taxes 812 and export taxes 814 that apply for transaction involving first entity 810 are thereafter dynamically tuned to evolving marketplace conditions 802 and to changes in competitive tax rates 822. As a result, the invention operates to semi-automate trade wars.

Thus, decision support is provided for participants with respect to tax rate in accordance with embodiments of the invention. For instance, based on market principles, when a global competitor floods a particular advertising market, the response is to increase the import tax to bring prices comparably close. In this regard, the import/export tax rate applied at any given moment can be determined dynamically and adjusted semi-automatically based on parameter adjustment for the tax rate. The decision support provided in accordance with the invention may be applicable to anti-dumping, arbitrage practices, etc., i.e., anywhere where global market practices may be impacted by competitive practices, participants can be assisted via decision support.

In another non-limiting embodiment, an online advertising exchange enables the automatic erection of trade barriers between specific parties—similarly to the way that countries erect trade barriers between one another, but performed automatically in accordance with sound economic principles. The notion of an advertising import/export tax is thus introduced for an online advertising exchange. Since both sides of a transaction may be subject to import/export tax, the exchange of the invention operates to automatically normalize for such taxes in purchase price, thereby normalizing deficits with respect to one another. In addition, the invention operates to localize business in a global marketplace, even where a party is only an exporter or only an importer, or both, making for better rational economic behavior by all parties.

Figure 9:
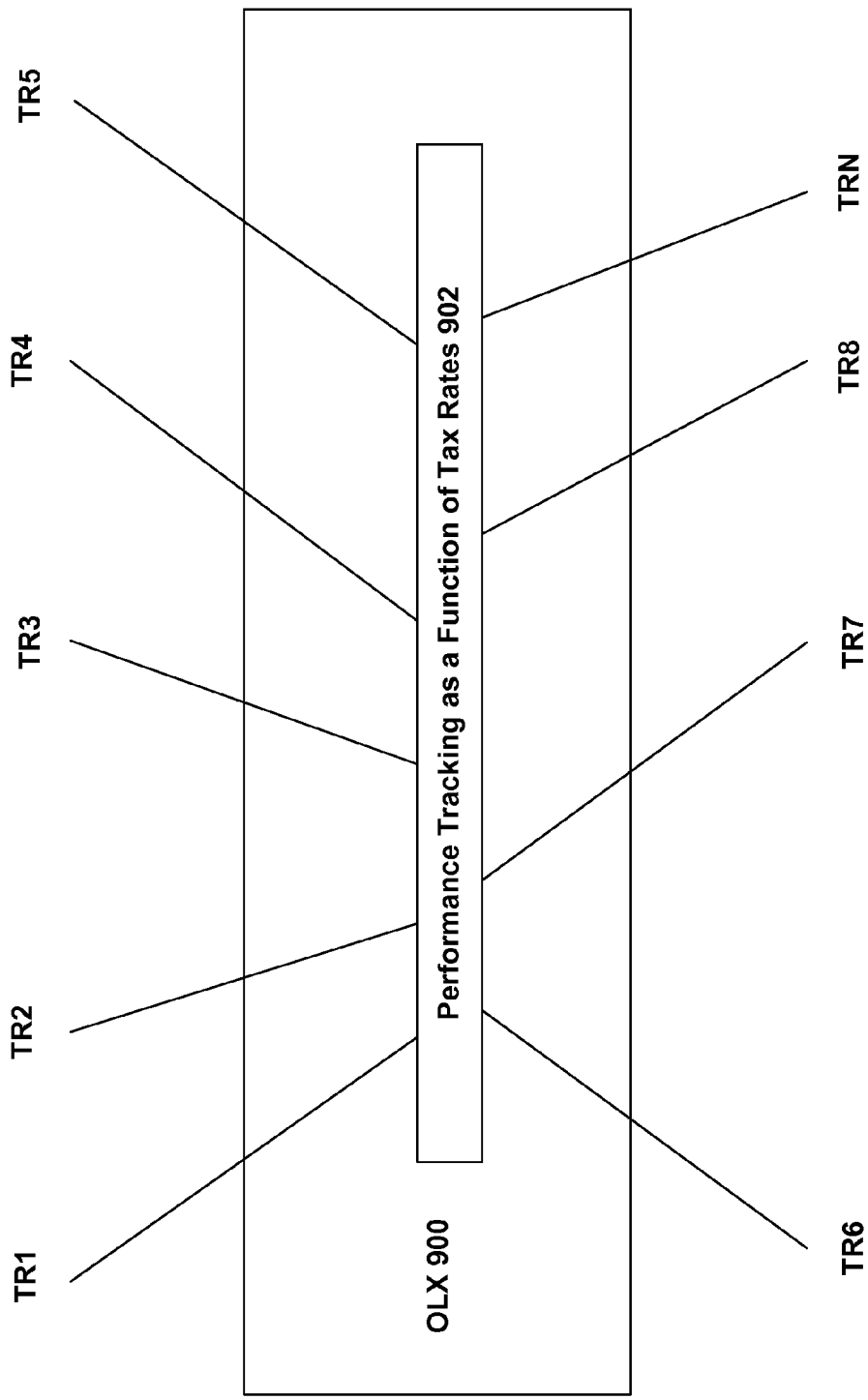
FIG. 9 illustrates exemplary performance tracking of tax rates selected by users in accordance with the invention.

In further embodiments of the invention, performance tracking, such as conversion tracking or clickthrough rate tracking, is enabled for the exchange of the invention to provide a more solid understanding of how tax rates actually perform for advertising transactions across advertising networks and across a great number of different participants. Performance tracking enables a more holistic view of performance for different advertising products as a function of tax rates selected by participants in accordance with the invention. As shown by the online advertising exchange (OLX) 900 of FIG. 9, at different levels of granularity, the invention includes the ability to track the performance of tax rate information TR1, TR2, TR3, TR4, TR5, TR6, TR7, TR8, ..., TRN provided to the exchange by different participants.

For instance, for a given set of transactional constraints, by collecting performance information for transactions as a function of tax rates via a tracking component, over time, a dynamic view is enabled over the performance of different tax rates, and different combinations of tax rates, across transactions conducted in the exchange. In simple terms, some tax rates will tend to perform better than other tax rates selected for a given set of constraints on advertising transactions, and such performance may be different than theory suggests. With access to this performance information for tax rates for a given set of transactional constraints, participants can dynamically optimize tax rates applied to transactions in line with the way tax rates are actually performing.

Thus, as one non-limiting example of performance tracking provided in the distributed framework for online advertising in accordance with the invention, pricing can be made more accurate because conversion information, or other performance information such as clickthrough rate, is available across parties. Where a correlation exists between the performance of tax rates applied by a participant and a specific goal of the participant, the participant can quantify the tax rates in terms of their bottom lines.

Thus, in accordance with the invention, any measurement of performance as well as any measure of the quality level for advertisements or publishing inventory as a function of tax rates can be taken into account by having the participants of the invention adopt optimal tax rates that account for bad performance.

Figure 10:
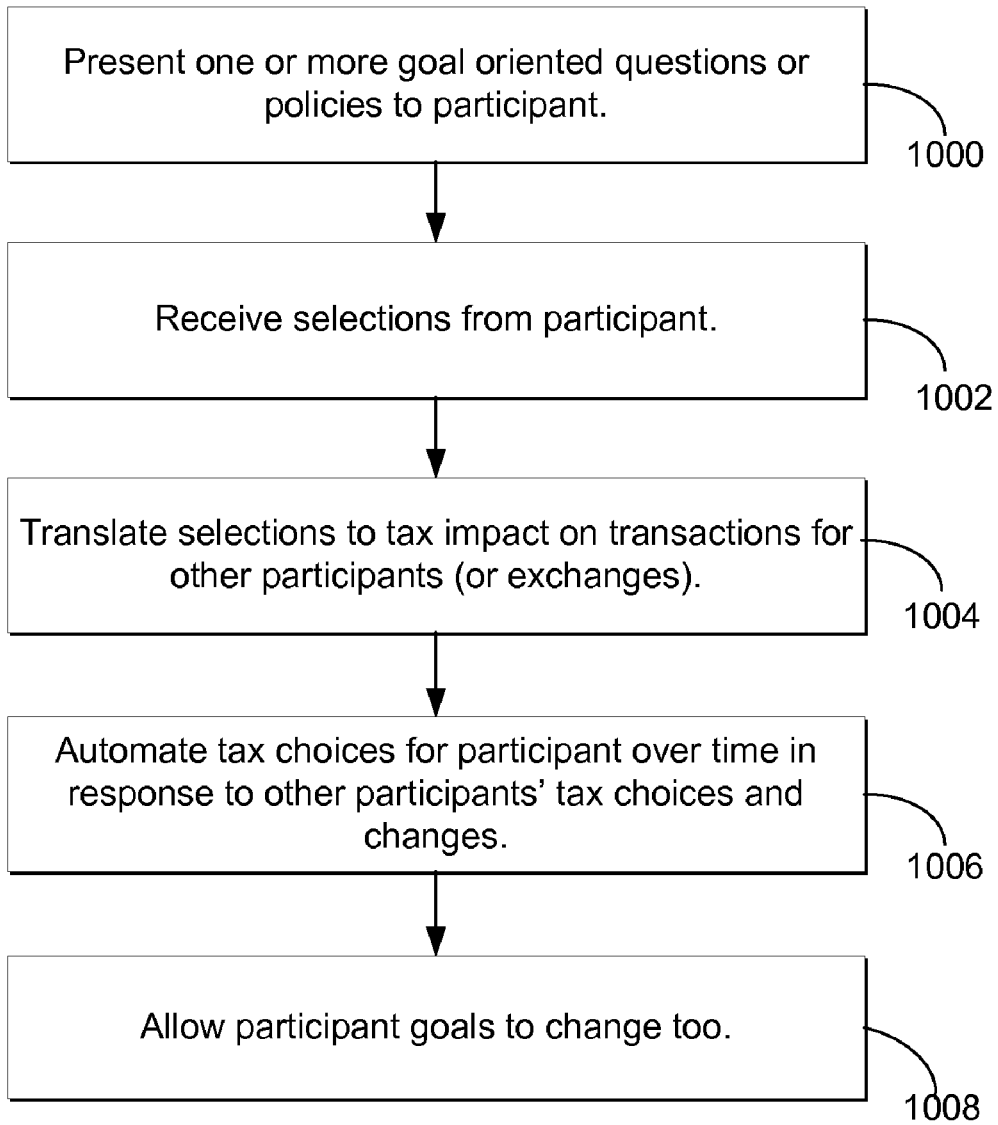
FIG. 10 is a flow diagram of an exemplary process for providing decision support for tax rate selection in accordance with the invention.
Figure 11:
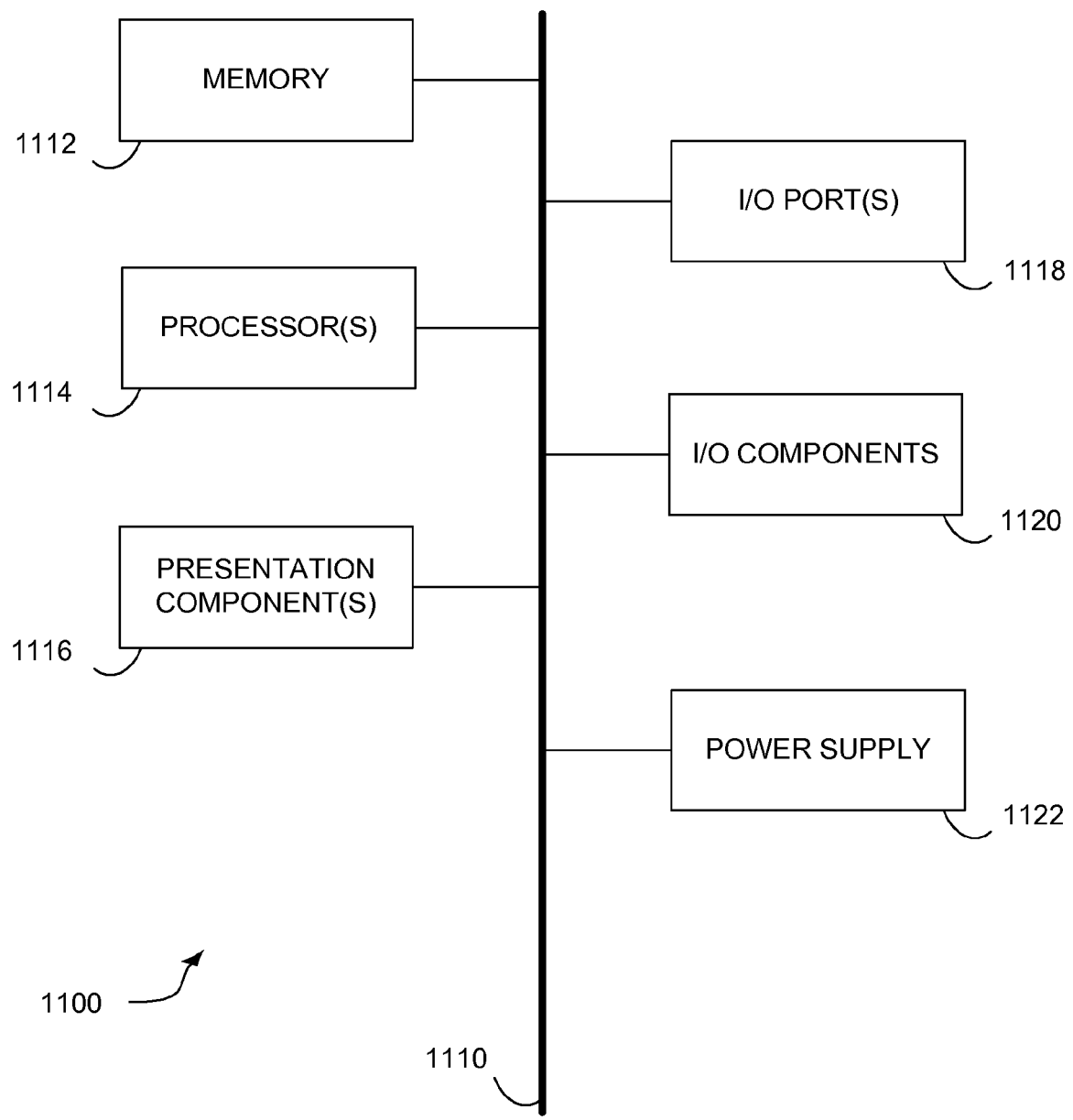
FIG. 11 is a block diagram of a computing system environment suitable for use in implementing the present invention.

FIG. 10 is a flow diagram of an exemplary decision support process in accordance with the invention. At 1000, a tool presents one or more goal oriented questions or policies to a participant. At 1002, the participant enters the goals of the participant. For instance, questions can be asked about how much the user is concerned about various topics. At 1004, the invention operates to translate the participant's selections to tax impact on transactions for other participants (or exchanges), e.g., in terms of import taxes and export taxes. At 1006, tax choices are then automated for the participant over time in response to other participants' tax choices and changes. A participant's goals can be changed via the tool as well at 1008, in which case the tax rates are reset according to new tax directives.

As a result, the invention creates a more certain marketplace with decreased variance for expected results for transactions. Since the information provided by the user likely is not useful to all participants in the exchange, the invention may also allow distributed users to submit competitive information to one or more participants of the advertising exchange, where the participants who benefit from the information provided by the user in turn compensate the associated user.

Similarly, one could derive a set of consequences for a tax rate decision, and double check that the participant wishes to make a decision according to those expected effects.

Having described various non-limiting embodiments of the specification and normalization of tax rates for participants of a federated advertising framework and various non-limiting embodiments for intelligent decision support for tax rate selection in accordance with the invention, exemplary non-limiting operating and advertising exchange environments in which the various embodiments may be implemented are now described.

Exemplary Operating Environment(s)

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated. In accordance with the invention, participants can communicate with an advertising exchange via one or more computing devices 100, and the advertising exchange may also comprise one or more computing devices 100, in order to carry out one or more aspects of the invention described in detail below.

In this regard, the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following elements: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory, or otherwise communicate with memory. It should be noted that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Exemplary Architecture(s) for Online Advertising

Figure 12:
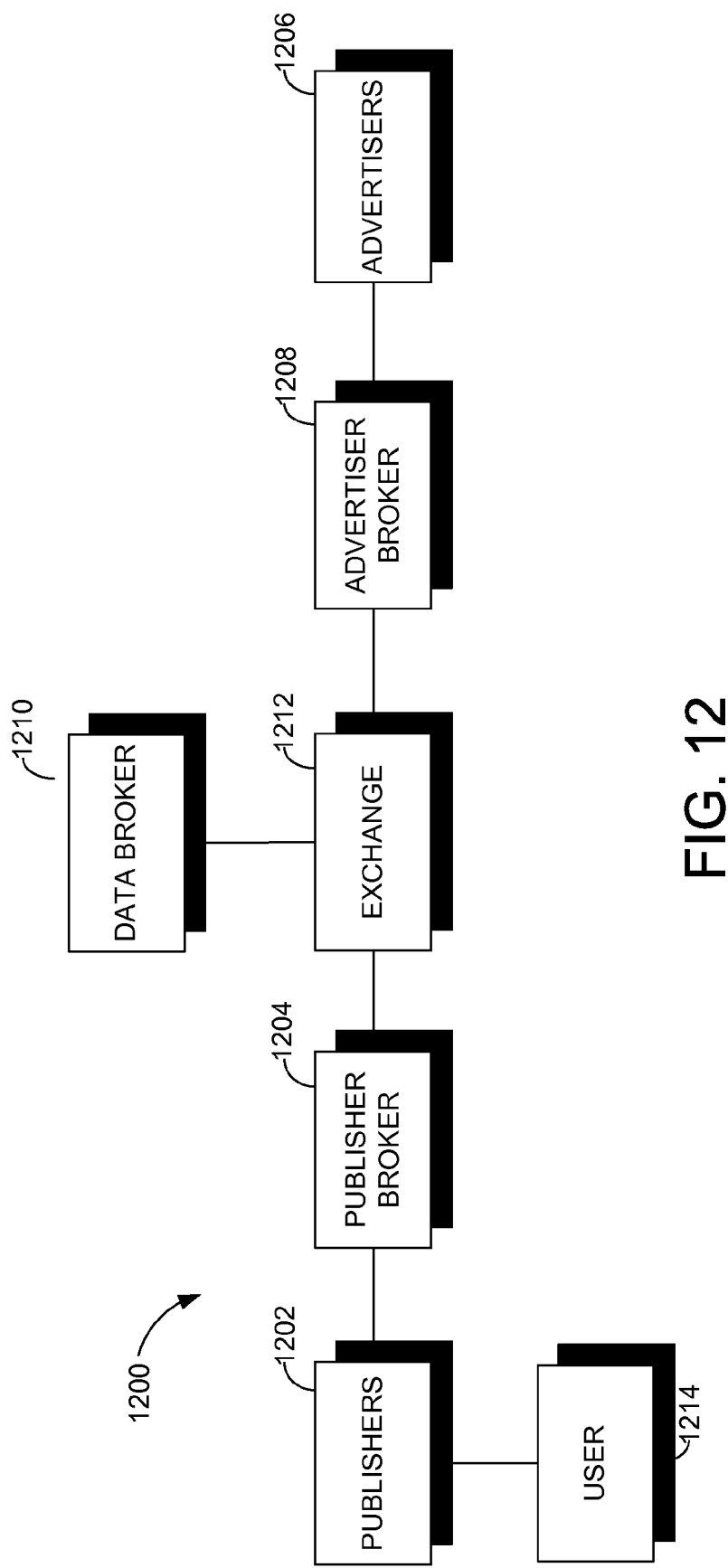
FIG. 12 illustrates a distributed architecture for online advertising, according to embodiments of the present invention.

Exemplary online advertising environments or architectures in which one or more of the various embodiments of the specification and normalization of participant tax rates, and intelligent automation of tax rate selection of the present invention may be deployed or implemented are now described. For instance, FIG. 12 illustrates an exemplary distributed architecture 1200 for online advertising, which comprises publishers 1202. For purposes of explanation only, publishers 1202 will be discussed herein as a group of any number of publishers. However, embodiments of the present invention are not limited to a group of publishers, as a single publisher is sufficient. Also, embodiments of the present invention are not limited to a single group of publishers, as any number of groups of publishers may be present in architecture 1200.

In an embodiment, each publisher is a content provider. For example, a construction worker who operates a single page website on which he posts a weblog (blog) may be a publisher. In another example, a media company such as Disney, who operates a huge website with many pages of content may also be a publisher. Publishers 1202 is intended to represent any number of types, sizes, sophistication levels, etc. of publishers. In an embodiment, publishers 1202 desire to sell advertisement space on their websites to advertisers 1206 (discussed below).

Architecture 1200 also comprises publisher broker 1204. For purposes of explanation only, only one publisher broker will be discussed herein. However, embodiments of the present invention are not limited to a single publisher broker, as any number of publisher brokers may exist. In an embodiment, publisher broker 1204 is an aggregator of publishers. Specifically, publisher broker 1204 is an entity that represents publishers 1202 with the goal of maximizing ad revenue, ensuring quality ads, etc. Publisher broker 1204 breaks the conflict of interest that is inherent in systems such as Google's AdSense by solely focusing on managing publishers 1202's yield. Publisher broker 1204 allows small and mid-size publishers (such as those that may be represented by publishers 1202) to aggregate in order to drive higher yield for themselves. In an embodiment, publisher broker 1204 maintains a user interface through which it interacts with publishers 1202 and through which it manages publishers 1202's preferences.

In an embodiment, publisher broker 1204 comprises a publisher center and a publisher delivery system. The publisher center allows publishers to manage their preferences. The publisher delivery system is used to calculate the ask for a given page view on the publisher's site, and potentially enrich the available user data in the request. In an embodiment, the ask is an asking price. However, embodiments are not so limited, as the ask may be, e.g., a minimum cost-per-click, minimum relevance, some other performance metric, etc.

The publisher center establishes traffic inventory groupings in the system and sets asks. When a user makes a page request to the publisher, the publisher populates their page with some scripting that sets up a call to the publisher broker. The publisher may add in some information about the user to the call to the publisher broker (the incentive would be that more publishers would want to use a publisher broker that had this sort of value added service). The publisher broker determines what the ask should be for a particular request, given the user information present, the inventory grouping that the request falls into, and the rules the publisher has set up around that information. Additionally, the publisher broker will pass along the maximum amount that the publisher is willing to pay to have any unknown data attributes about the user populated for this request. Finally, the publisher broker encodes this information into a request URL that it sends back to the user as a redirection URL. When all transactions have occurred in the exchange (see below), a call back is provided to the publisher broker stating whether and how many ads were displayed and what the publisher broker can expect in terms of a payment.

Architecture 1200 also comprises advertisers 1206. For purposes of explanation only, advertisers 1206 will be discussed herein as a group of any number of advertisers. However, embodiments of the present invention are not limited to a group of advertisers, as a single advertiser is sufficient. Also, embodiments of the present invention are not limited to a single group of advertisers, as any number of groups of advertisers may be present in architecture 1200.

In an embodiment, each advertiser purchases ad space on websites. For example, a local businessperson who operates a website for her small flower shop and who advertises on a neighborhood homeowners' association website may be an advertiser. In another example, a massive corporate entity such as General Motors, which has thousands of products and services, and which advertises on thousands of automotive-related websites may also be an advertiser. Advertisers 1206 is intended to represent any number of types, sizes, sophistication levels, etc. of advertisers. In an embodiment, advertisers 1206 desire to pay money to place ads on publishers 1202's websites.

Architecture 1200 also comprises advertiser broker 1208. For purposes of explanation only, only one advertiser broker will be discussed herein. However, embodiments of the present invention are not limited to a single advertiser broker, as any number of advertiser brokers may exist. In an embodiment, advertiser broker 1208 is an aggregator of advertisers. Specifically, advertiser broker 1208 is an entity that represents advertisers 1206 with the goal of optimizing advertisers 1206's spending and placing monetary values on displaying advertising of a particular format, on a particular website, to a particular audience. In an embodiment, advertiser broker 1208 maintains a user interface through which it interacts with advertisers 1206, and through which it manages advertisers 1206's preferences, such as preferences for particular user data attributes. However, embodiments of the present invention are not limited to any particular advertiser preferences.

In an embodiment, an advertiser sets up ads in the advertiser broker system, but has no further interaction with the exchange (see below) or end user until such a point as the end user clicks on their ad. In an embodiment, the exchange (see below) carries enough information to allow for advertisers to setup self-optimizing campaigns based only on landing URLs, creatives, and campaign goals. Similarly, algorithms can be run on advertiser landing URLs to choose possible subsets of audience attributes as well as relevant topics (keywords, categories, and content pages). The available features can then be selected to maximize the campaign goals, for example branding campaigns would minimize the amount paid per impression and maximize the coverage and inventory quality. A sales campaign on the other hand would be selected to track conversions and maximize the number of high value conversions for the existing advertiser budget.

Architecture 1200 also comprises exchange 1212. Exchange 1212 acts as a mediator among publisher broker 1204 and advertiser broker 1208. In an embodiment, exchange 1212 routes traffic and facilitates transactions, e.g., auctions, between publisher broker 1204 and advertiser broker 1208. In an embodiment, exchange 1212 is a server or a set of servers.

To provide minimum standards of conformity, in an embodiment, exchange 1212 provides collection symbols related to the category of the publisher's page, the meaningful keywords in it, as well as geo-location information extracted from the user's IP address. The base data, such as the user IP address, the URL of the publisher's page, and any other such information deemed relevant should also be provided to each advertiser broker so that the advertiser broker may attempt to extract additional information to provide value-added services to the advertisers they service. In an embodiment, exchange 1212 sends all publisher broker requests that match a set of criteria defined by the advertiser broker, along with all relevant data about the request (e.g., the ask and collection symbols provided by the publisher and the exchange itself). In an embodiment, if the advertiser broker has any ads that it would like to have displayed and that meet the ask, it returns those ads, up to the number of ads requested, along with a CPI (cost per impression) bid on each. It is noted that CPM (cost per thousand impressions) and CPI are equivalent pricing models with different acronyms. However, embodiments are not limited to CPI pricing, as other pricing models may be used, e.g., CPC (cost per click), CPA (cost per acquisition), and revenue sharing. Exchange 1212 provides a call back to the winning advertiser broker(s) telling it which ads were displayed, and at what prices.

Architecture 1200 also comprises users 1214. For purposes of explanation only, only one user will be discussed herein. However, embodiments of the present invention are not limited to a single user, as any number of users may exist. Users 1214 request a webpage from publishers 1202. The webpage comprises content and advertisement space, which is filled with advertisement(s) from advertisers 1206.

Using architecture 1200, audience data can be provided to advertisers 1206 either by enriching the publishing property with customer intelligence or by acquiring the data directly from a data broker 1210 on the basis of a licensing fee. For instance, advertiser broker 1208 can choose to pay an estimated monthly per volume amount for each attribute that their advertisers are interested in targeting. This transaction could be done off-line but would need to be registered with exchange 1212 to facilitate data rerouting at request time. Advertiser broker 1208 can base its bids on any targeting attributes provided by data broker 1210.

In an embodiment, when publishers 1202 have an impression that they are willing to sell (with an optional ask), they can provide a URL and any targetable values to exchange 1212. Exchange 1212 passes this data and possible additional user data from data broker 1210 to advertiser broker 1208. In an embodiment, advertiser broker 1208 ranks the bids of advertisers 1206 using any proprietary attributes or techniques that it finds useful. For example, advertiser broker 1208 could choose to run keyword extraction or categorization and use this for targeting. Advertiser broker 1208 would output a CPI ranked list of advertisers (in an embodiment, the number would be equal to the number of ads requested by the publisher). In an embodiment, where multiple advertiser brokers exist, exchange 1212 then ranks all ads across all advertiser brokers and chooses the best one (as measured by CPI). If these ads meet or exceed the publisher ask, then exchange 1212 proxies a display of the ads on the publisher website.

A second-price auction can still be applied to facilitate aggressive bidding. Publishers 1202 can get paid on a CPI basis. In an embodiment, exchange 1212 may be used to gate user information originating from publishers 1202. Publishers 1202 can choose to enrich their property with user data and share this information only with selected advertiser brokers.

Because publishers 1202 are concerned with user satisfaction, they would prefer to have some control over the relevancy of the ads placed on their site. Click-through rate is considered a good measure of relevance and therefore many publishers might want minimum click-through guarantees on the ads. Exchange 1212 allows publishers 1202 to optionally specify a minimum click-through rate that is acceptable. Exchange 1212 monitors advertiser broker 1208 to make sure that if it wins these types of asks, then it is meeting the performance guarantees. In an embodiment, if an advertiser broker consistently provides low click-through rates for publisher asks that require a minimum, exchange 1212 may take punitive measures such as suspension from the system.

Advertiser broker 1208 is responsible for converting any externally facing pricing models it allows into the CPI bid on each request. For example, a simple CPC to CPI conversion would be to multiply the per click bid of each ad by the expected click through rate of the ad for the conditions present. Similarly, to convert a CPA bid to CPI, advertiser broker 1208 could multiply the conversion rate by the per conversion bid of the advertiser. The more information available in each request, the better job advertiser broker 1208 can potentially do in predicting the probability of a click or a conversion.

The entity hosting exchange 1212 has access to all data sources, giving it the power to make partial decisions. To alleviate the concern that exchange 1212 will not be impartial both as hosting body and as a direct participant, in an embodiment, transparency will be built into exchange 1212. In that embodiment, exchange 1212 does not have a way to identify brokers of any kind. Also, in that embodiment, advertiser auction algorithms and advertiser to publisher matching algorithms are standardized and transparent to all exchange participants. In an embodiment, no user identifiable information is sent to advertisers 1206 until the user performs an action. Exchange 1212 passes advertiser broker 1208 only the attribute values. Advertisers 1206 do not see the user identifier. At click-time, however, it is still possible for an advertiser to establish a user identifier and associate the bidding profile with that user. For example, exchange 1212 could require a linear value function, and advertisers 1206 would specify a base bid and a bid increment for each attribute value.

In one example, Expedia as an advertiser has an ad for "cheap vacations in Bali." Expedia chooses the keyword "Bali vacations." Business intelligence suggests that the best way to target vacation ads is around users who have a history of purchasing vacations, users who recently have purchased books on vacations and users who perform searches related to travel. Expedia decides to license user information from Amazon, MSNSearch, and Orbitz. Expedia agrees to pay Amazon 1 cent for using their user information for each ad impression. Similarly, Expedia agrees to pay 1 cent to MSNSearch and 3 cents to Orbitz.

For the "cheap Bali vacations" ad, Expedia creates a targeting profile for users who: "bought a book on Bali in the last month," "Have traveled to a tropical location in the last two years," "Have household income between $30,000 and $60,000," "Have been searching for vacation deals," and "Have ever clicked on ads." Expedia places a 20 cent base bid. To express their bidding preference, they also place a 5 cent incremental bid for the first attribute, a 10 cent incremental bid for the second attribute, a 2 cent incremental bid for the third attribute, 1 cent incremental bid for the fourth attribute, and a 2 cent incremental bid for the fifth attribute to express their bidding preference. Borders as a publisher has a user requesting the page on the "Lonely Planet Guide to Indonesia" and they would like to show ads on that page. They call exchange 1212 with the page URL and information about the user: "Bought four travel books in the last month," "Bought a book on Bali in the last month," and "Has clicked on ads before."

Given the URL, exchange 1212 extracts keywords ("Bali vacations," "Indonesia travel," "exotic vacations," "beach vacations") and categories ("travel," "vacations"), and sends this information to each advertiser broker. Each advertiser runs an auction for the impression. The advertiser broker can choose to ask for aggregate bids from advertisers. For example, Expedia might place an aggregate bid of 24 cents, and after subtracting the licensing fees, their base bid would be equal to 20 cents. Expedia's advertiser broker needs first to subtract all incremental bids and to assign credit to the publisher as appropriate. For example, Expedia's 5 cent incremental bid for "bought a book on Bali in the last month" and their 2 cent incremental bid for "Have ever clicked on ads" will be assigned to the publisher. The value for "Have traveled to a tropical location in the last two years" attribute is provided by Orbitz so the 10 cent incremental bit would be assigned to them. The publisher was not able to assess the household income of the user so this incremental bid is not used. The 1 cent incremental bid for the search user patterns will be credited to MSNSearch. After the appropriate credit distribution the advertiser broker would assign a publisher value bid (the base bid+ any incremental publisher bids) to each advertiser. In case of Expedia publisher value bid would be equal to 27 cents. Given that Expedia's bid is CPC based, the advertiser broker needs to convert it to a CPI one before running an auction and selecting the best ads to send to the exchange. Expedia's advertiser broker knows that this specific ad is likely to get a 10% CTR, and thus for ranking purposes, Expedia is assigned a 2.7 cent CPI bid. If Expedia wins within its advertiser broker, its ad will be sent for global ranking to the exchange. If Expedia wins the global auction then their advertiser broker is charged 2.7 cents for displaying the Expedia ad. Expedia's ad gets served on Border's page. The user clicks on the ad. The user buys a two-week vacation to Bali.

Figure 13:
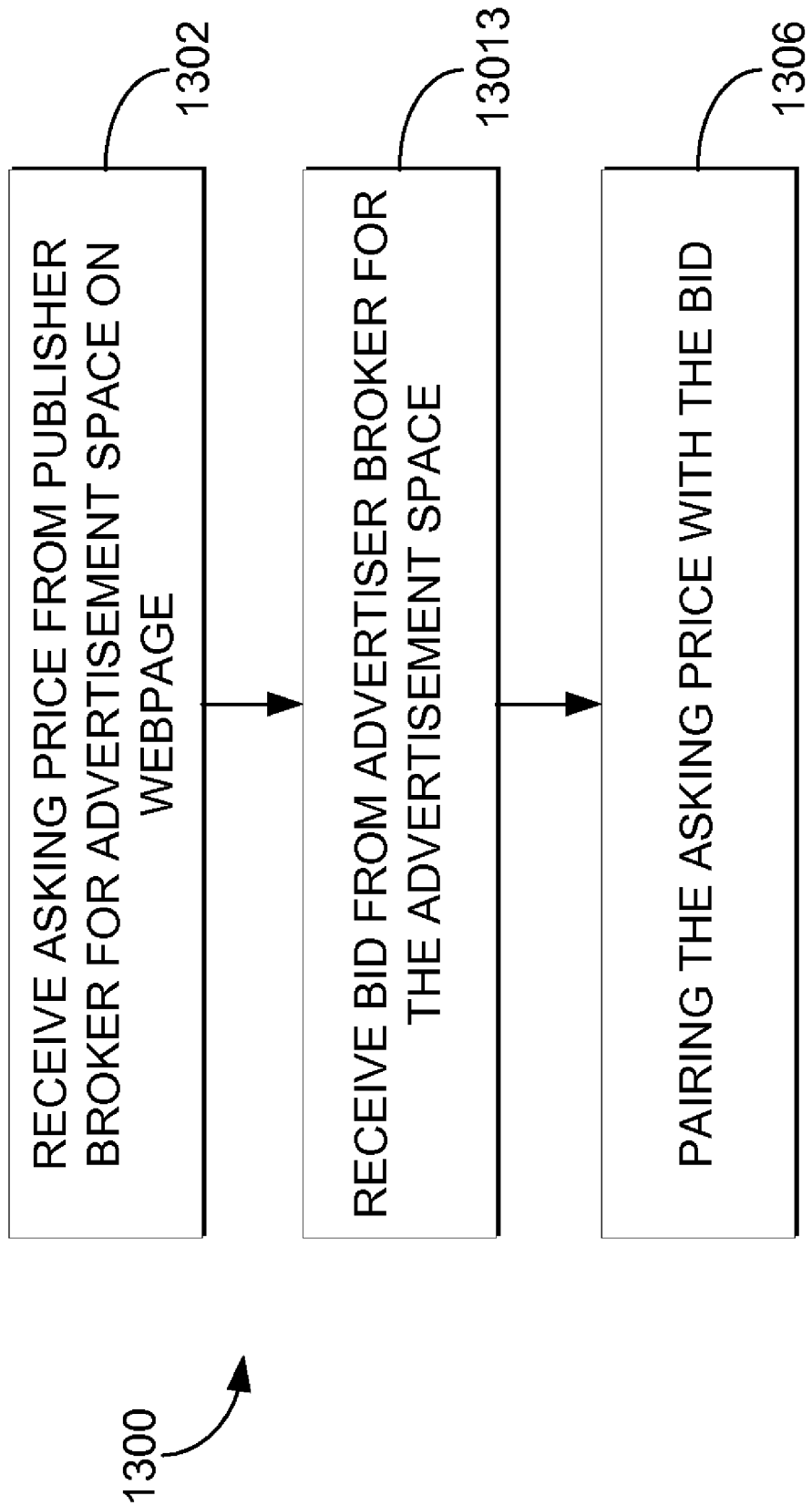
FIG. 13 illustrates one example of the flow of data within an exemplary non-limiting architecture according to embodiments of the present invention.

FIG. 13 illustrates a flowchart of the operation of an exchange, according to embodiments of the present invention. Referring to FIG. 13, method 1300 begins with the receipt of an ask from a publisher broker for advertisement space on a webpage (1302). A bid is received from an advertiser broker for the advertisement space (1304). In an embodiment, bids are received from many different advertiser brokers. The ask is paired with one of the bids (1306) and the advertisement space on the webpage is awarded to the winning bidder. As discussed in greater detail above, other information such as user attributes may be attached to the ask, and quality of the bidding advertisers may be examined prior to the advertisement space being awarded.

Accordingly, in non-limiting embodiments, the invention includes a system to facilitate trading of advertising by having a publisher broker to represent publisher(s) that determines an ask for an advertisement space on the publisher(s)' webpages. An advertiser broker also represents advertiser(s) and manages an advertiser(s)' bid for the advertisement space. The exchange of the invention then facilitates transactions for advertisement space between the publisher broker and the advertiser broker.

Figure 14:
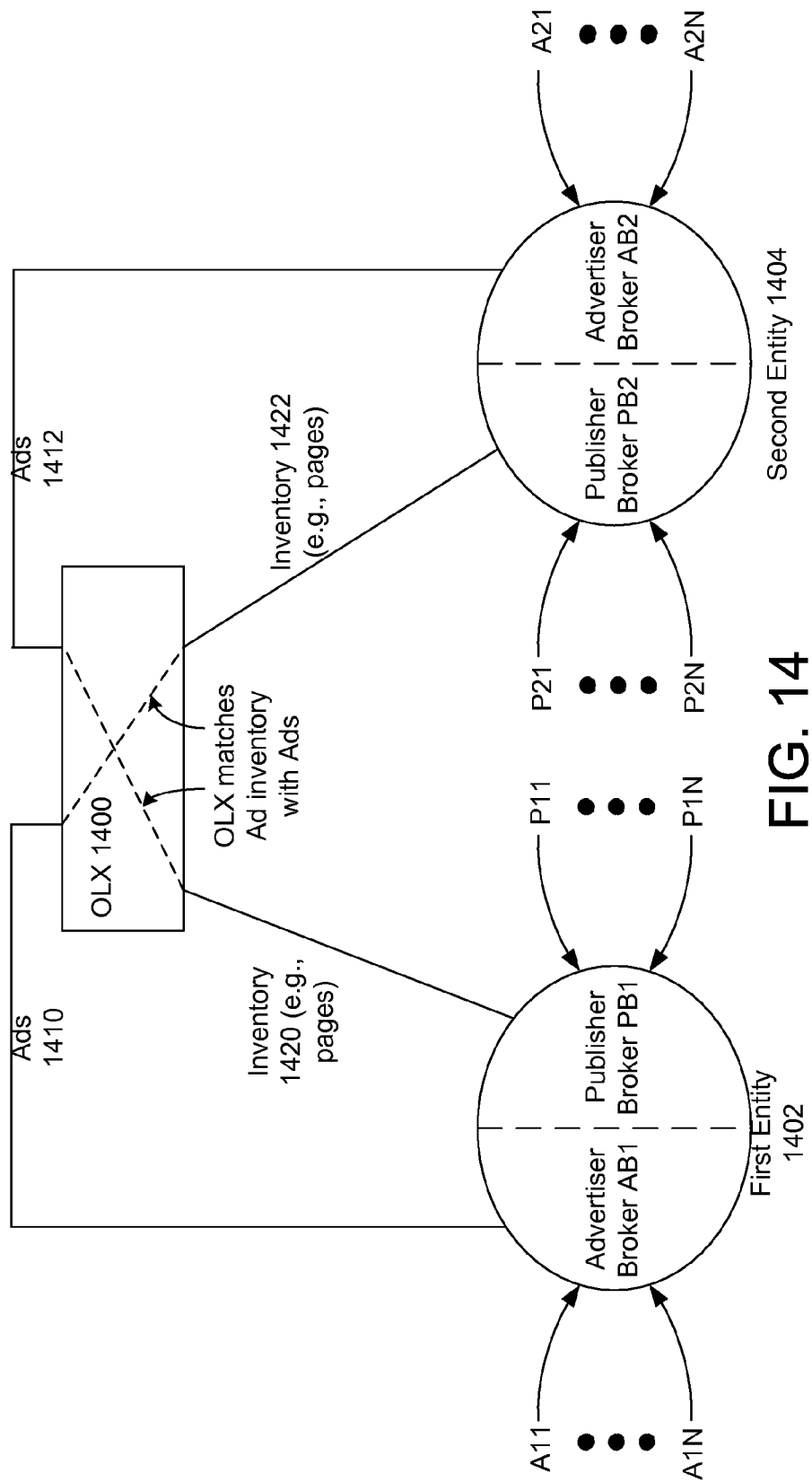
FIG. 14 illustrates a flowchart of the operation of an exchange, according to exemplary, non-limiting embodiments of the present invention.

The invention thus can operate in a system that enables broad liquidity over distributed advertising markets, such as the above-described advertising exchange systems. FIG. 14 illustrates a conceptual block diagram of an on-line advertising exchange 1400 provided in accordance with the invention. As shown, a first entity 1402 and a second entity 1404 are subscribers to the services of exchange 1400. First entity 1402 may have an advertiser broker AB1 for brokering advertisements 1410 from a variety of sources A11 thru A1N and a publisher broker PB1 for brokering inventory 1420 from a variety of publishers P11 thru P1N. A goal of ad broker AB1 is to find inventory for existing advertisements. A goal of publisher broker PB1 is to represent publishers, i.e., to help obtain revenue for their inventory (e.g., pages). Similarly, second entity 1404 may have an advertiser broker AB2 for brokering advertisements 1412 from a variety of sources A21 thru A2N and a publisher broker PB2 for brokering inventory 1422 from a variety of publishers P21 thru P2N.

In accordance with the invention, by providing ads 1410 and 1412 to OLX 1400 according to a first communications layer, and by providing inventory 1420 and 1422 to OLX 1400 according to an independent communications layer, OLX 1400 can efficiently match advertisements to available inventory with greater simultaneous knowledge of multiple advertising networks.

Figure 15:
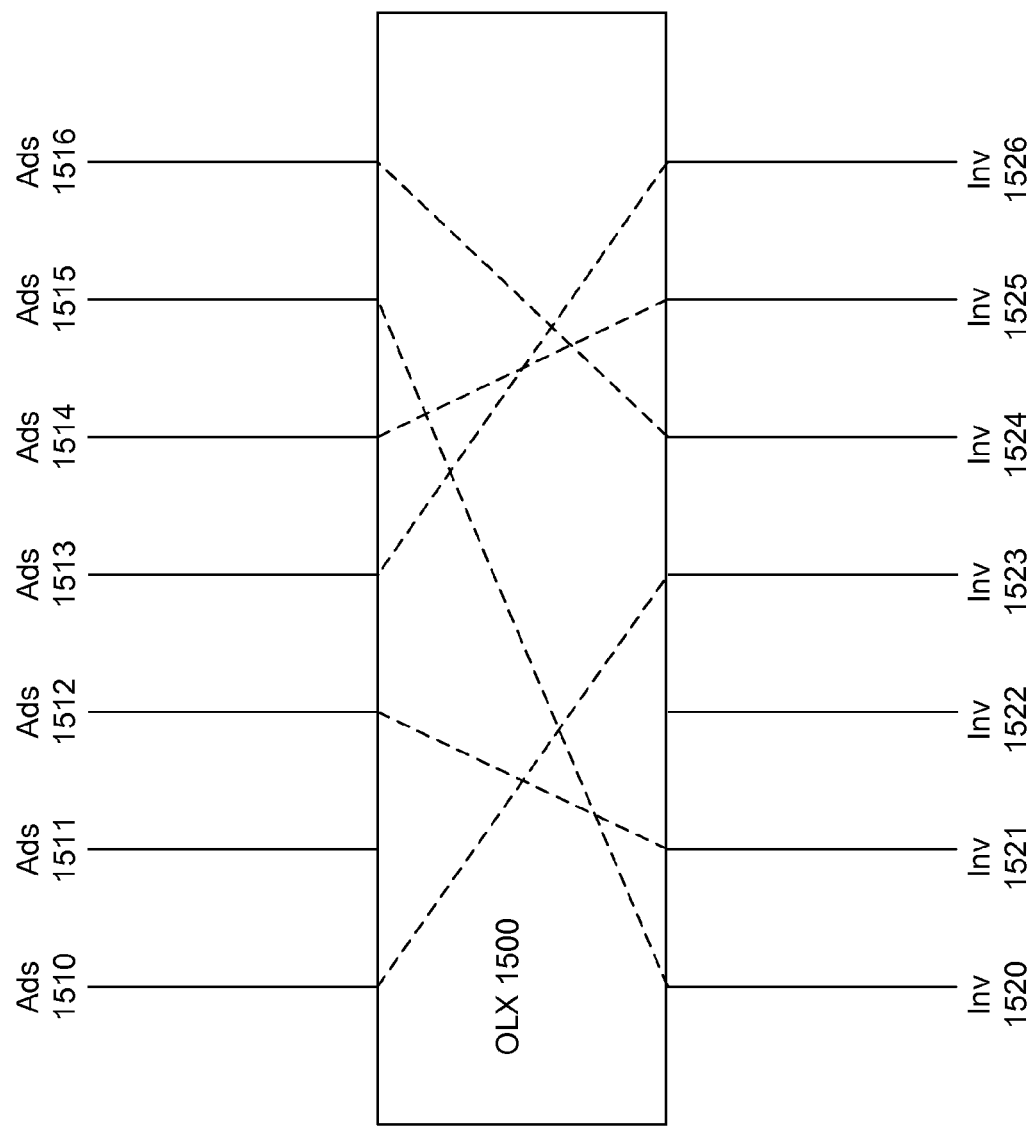
FIG. 15 illustrates a flowchart of the operation of user or a user data broker to provide potentially valuable information according to embodiments of the present invention.

For instance, first entity 1402 might be Microsoft's MSN Web site, and second entity 1404 might be Yahoo's portal Web site. For simplicity, FIG. 14 illustrates only two entities, but advantageously, the invention can also be scaled to accommodate any number of advertising networks, e.g., eBay, Amazon, Google, etc. This is illustrated in FIG. 15 showing an OLX 1500 that accommodates a wide range of advertising 1510, 1511, 1512, 1513, 1514, 1515, 1516, etc. from a wide range of parties, and also accommodates a wide range of inventory 1520, 1521, 1522, 1523, 1524, 1525, 1526, etc. from a wide range of parties. OLX 1500 then makes the best assessment of how to match advertising content with inventory according to a variety of policies (e.g., maximizing ad revenue, maximizing quality of advertising, maximizing conversion rate, etc.). While various non-limiting embodiments of the invention are described in the context of two parties herein, this is for ease of conceptual presentation. It can be appreciated that the invention can be provided for any arbitrary number of advertising entities wishing to join the exchange 1500.

The invention may also be implemented in a peer-to-peer architecture, wherein processing performed by the exchange of the invention is shared across multiple participating machines. In such a non-limiting embodiment, each machine participating in the exchange network enabled by the invention can share some of the processing associated with normalization processes performed by the various embodiments of the on-line exchange of the invention.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

There are multiple ways of implementing the present invention, e.g., an appropriate API, tool kit, driver code, operating system, control, standalone or downloadable software object, etc. which enables applications and services to use the advertising techniques of the invention. The invention contemplates the use of the invention from the standpoint of an API (or other software object), as well as from a software or hardware object that operates according to the advertising techniques in accordance with the invention. Thus, various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts may be applied to any computing device or system in which it is desirable to advertise. While exemplary programming languages, names and/or examples are chosen herein as representative of various choices, these languages, names and examples are not intended to be limiting. One of ordinary skill in the art will also appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the advertising techniques of the present invention, e.g., through the use of a software object, data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described sura, methodologies that may be implemented in accordance with the disclosed subject matter will be better appreciated with reference to one or more of the figures. While for purposes of simplicity of explanation, in some cases, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to provide the disclosed embodiments for advertising methods. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for facilitating transactions for advertisement space for participants in an advertising exchange having at least two participating advertising entities from disparate advertising networks or disparate advertising exchanges, comprising:
  employing a processor to execute computer readable instructions stored on a computer readable medium to perform the following acts:
  receiving a first expression of a tax defined by a first participant in the advertising exchange that defines at least one tax preference of the first participant pertaining to conducting at least one transaction in the advertising exchange with a second participant, wherein the first expression include a tax rate in a first unit measure that is translatable to a common tax measure within the advertising exchange;
  receiving a second expression of a tax defined by the second participant in the advertising exchange that defines at least one tax preference of the second participant pertaining to conducting the at least one transaction in the advertising exchange with the first participant, wherein the second expression is in a second unit measure that is translatable with respect to the common tax measure within the advertising exchange; and
  normalizing the first expression and the second expression to the common tax measure enabling a quantifiable comparison of the tax defined by the first participant and the tax defined by the second participant.

2. The method according to claim 1, wherein the receiving the first expression further includes receiving an expression of an import tax or export tax defined by a first participant in the advertising exchange that defines at least one preference with respect to import or export characteristics of the at least one transaction in the advertising exchange.

3. The method of claim 1, wherein said normalizing includes normalizing the tax defined by the first participant according to a first advertising cost model to a common advertising cost model as part of conducting the at least one transaction.

4. The method according to claim 2, wherein said normalizing includes normalizing the tax defined by the first participant according to a cost per click (CPC) advertising cost model and the tax defined by the second participant according to a cost per acquisition (CPA) cost model to the common advertising cost model.

5. The method of claim 4, wherein said normalizing includes normalizing a flat fee tax defined by the first participant and a tax rate defined by the second participant according to a cost per acquisition (CPA) cost model to the common advertising cost model.

6. The method of claim 1, wherein said normalizing includes normalizing the tax defined by the first participant according to first way to express a tax and the tax defined by the second participant according to a second way to express a tax, different from the first way, to a common way to express a tax as part of conducting the at least one transaction.

7. The method of claim 1, wherein normalizing includes converting the first and second expressions to the common tax measure based on expected revenue from the at least one advertising transaction.

8. A system to facilitate trading of advertising, comprising:
  at least one processor that executes the following computer executable components stored on at least one computer readable medium:
  a publisher broker component to represent at least one publisher, wherein the publisher broker component determines at least one ask for an advertisement space of the at least one publisher;
  an advertiser broker component to represent at least one advertiser, wherein the advertiser broker component manages at least one bid for the advertisement space by the at least one advertiser;
  an exchange component that generates at least one transaction for the advertisement space between the publisher broker component and the advertiser broker component, wherein the publisher broker component and the advertiser broker component are advertising entities of disparate advertising networks, and
  at least one tool that receives from the publisher broker component or the advertiser broker component a specification of at least one objective corresponding to a policy of the publisher broker component or the advertiser broker component, and automatically calculates a tax rate that helps achieve the at least one objective by imposing a tax equal to the tax rate on transactions that meet conditions specified by the at least one objective, wherein the exchange component automatically applies the tax for the publisher broker component or the advertiser broker component in at least one transaction.

9. The system of claim 8, wherein the exchange component automatically normalizes additional taxes specified by the publisher broker component or the advertiser broker component to a common tax measure.

10. The system of claim 8, wherein the tax takes into account a reactive measure against market conditions.

11. The system of claim 8, wherein the tax includes at least one exchange tax applying to advertising or publishing inventory that is imported or exported from or to another exchange.

12. The system of claim 8, wherein the at least one tool receives a specification of a preference relating to the quality of advertising involved in advertising transactions, and wherein the exchange component automatically determines the tax rate based on the preference.

13. The system of claim 8, wherein the at least one tool receives a specification of a preference relating to the performance of advertising or publishing inventory involved in advertising transactions, and wherein the exchange component automatically determines the tax rate based on the preference.

14. The system of claim 8, wherein the at least one tool receives a specification of a preference relating to the relevance of advertising involved in advertising transactions, and wherein the exchange component automatically determines the tax rate based on the preference.

15. The system of claim 8, wherein the at least one tool receives a specification of a preference relating to the amount of risk the first participant is willing to undertake in advertising transactions, and wherein the exchange component automatically determines the tax rate based on the preference.

16. The system of claim 8, wherein the at least one tool receives a specification of a preference relating to the size of other participants in advertising transactions, and wherein the exchange component automatically determines the tax rate based on the preference.

17. The system of claim 8, wherein the tool takes into account a retaliatory measure taken by a competitor while trading.

18. A method for facilitating transactions for advertisement space in an advertising exchange between participants from at least two disparate advertising networks, comprising:

employing a processor to execute computer readable instructions stored on a computer readable medium to perform the following acts:

receiving a first utility function having an impact on a tax from a first participant by the advertising exchange, wherein the tax specified by the first participant applies to at least one transaction in the advertising exchange conducted with at least one other participant and includes a tax rate at a first unit of measure;

based on a normalized representation for taxes in the exchange enabling comparison of disparate types of taxes, exposing the tax to the at least one other participant, and exposing at least a second tax associated with the at least one other participant that applies to the first participant; and in response to the second tax exposed to the first participant, receiving an instruction from the first participant to change the first utility function to have a different impact on the tax applying to the at least one transaction conducted with the at least one other participant.

19. The method of claim 18, further comprising:

conducting the at least one transaction with the at least one other participant in the advertising exchange based on the different impact on the tax.

* * * * *